United States Patent
Cheng et al.

(10) Patent No.: US 12,401,464 B2
(45) Date of Patent: *Aug. 26, 2025

(54) HARQ HANDLING FOR NODES WITH VARIABLE PROCESSING TIMES

(71) Applicant: TELEFONAKTIEBOLAGET LM ERICSSON (PUBL), Stockholm (SE)

(72) Inventors: Jung-Fu Cheng, Fremont, CA (US); Mattias Andersson, Sundbyberg (SE); Yufei Blankenship, Kildeer, IL (US); Stefan Parkvall, Bromma (SE); Sara Sandberg, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 465 days.

This patent is subject to a terminal disclaimer.

(21) Appl. No.: 17/843,593

(22) Filed: Jun. 17, 2022

(65) Prior Publication Data

US 2022/0321282 A1  Oct. 6, 2022

Related U.S. Application Data

(63) Continuation of application No. 16/482,829, filed as application No. PCT/IB2018/052266 on Apr. 2, 2018, now Pat. No. 11,374,703.
(Continued)

(51) Int. Cl.
*H04L 1/18* (2023.01)
*H04L 1/08* (2006.01)
(Continued)

(52) U.S. Cl.
CPC ............. *H04L 1/1896* (2013.01); *H04L 1/08* (2013.01); *H04L 1/1812* (2013.01);
(Continued)

(58) Field of Classification Search
CPC ... H04L 29/06; H04L 47/10; H04L 29/06027; H04L 29/06163; H04L 1/1896;
(Continued)

(56) References Cited

U.S. PATENT DOCUMENTS 10,735,134 B2 *  8/2020  Soriaga ............. H03M 13/6393
10,790,934 B2 *  9/2020  Ye .................... H03M 13/6306
(Continued)

FOREIGN PATENT DOCUMENTS

EP  0798889 A2  10/1997
EP  3567773 A1  11/2019
(Continued)

OTHER PUBLICATIONS

3GPP TSG RAN WG1 Meeting #88bis, Spokane, USA Apr. 3-7, 2017, R1-1704918, Agenda Item: 8.1.3.3.2, Source: LG Electronics, Title: Discussion on CB group based HARQ-ACK feedback. (Year: 2017).*
(Continued)

*Primary Examiner* — Peter G Solinsky
*Assistant Examiner* — Sanjay K Dewan

(57) ABSTRACT

A method for use in a transmitter includes sending a transmission comprising a transport block (TB) comprising a plurality of code blocks (CBs) arranged in one or more code block groups (CBGs). Each code block group includes one or more code blocks and each code block includes a plurality of coded bits. The transmission is sent to a receiver configured to use multi-bit hybrid automatic repeat request (HARQ) feedback per transport block. The method further includes receiving HARQ ACK or NACK feedback from the receiver one or more of the one or more code block groups of the transport block. The method further includes determining a number of code blocks or code block groups to
(Continued)

send to the receiver in a retransmission based on at least the received HARQ ACK or NACK feedback.

19 Claims, 8 Drawing Sheets

Related U.S. Application Data

(60) Provisional application No. 62/481,048, filed on Apr. 3, 2017.

(51) Int. Cl.
*H04L 1/1812* (2023.01)
*H04L 1/1829* (2023.01)
*H04L 1/1867* (2023.01)
*H04L 5/00* (2006.01)
*H04W 72/04* (2023.01)
*H04W 72/23* (2023.01)

(52) U.S. Cl.
CPC .......... *H04L 1/1819* (2013.01); *H04L 1/1864* (2013.01); *H04L 1/1887* (2013.01); *H04L 5/0055* (2013.01); *H04W 72/23* (2023.01)

(58) Field of Classification Search
CPC ....... H04L 1/08; H04L 1/1812; H04L 1/1819; H04L 1/1864; H04L 1/1887; H04L 5/0055; H04Q 11/0478; H04W 72/23; H04W 72/042
USPC ......................................................... 370/465
See application file for complete search history.

(56) References Cited

U.S. PATENT DOCUMENTS

| | | | |
|---|---|---|---|
| 10,897,331 B2 | 1/2021 | Guan et al. | |
| 11,677,497 B2* | 6/2023 | Jeong .................. | H04L 1/0067 714/776 |
| 2007/0011504 A1 | 1/2007 | Kim et al. | |
| 2009/0086845 A1 | 4/2009 | Demirhan | |
| 2009/0313516 A1 | 12/2009 | Shin | |
| 2011/0154144 A1 | 6/2011 | Nanda | |
| 2014/0185444 A1 | 7/2014 | Inoue et al. | |
| 2015/0067435 A1 | 3/2015 | Yerramalli et al. | |
| 2016/0226643 A1 | 8/2016 | Mallik | |
| 2017/0085343 A1 | 3/2017 | Seo et al. | |
| 2017/0135080 A1 | 5/2017 | Xia et al. | |
| 2018/0196715 A1 | 7/2018 | Balasubramanian | |
| 2018/0375616 A1 | 12/2018 | Beale | |
| 2019/0020445 A1* | 1/2019 | Kim ...................... | H04L 1/0057 |
| 2019/0036654 A1* | 1/2019 | Kim ...................... | H04L 1/1812 |
| 2019/0165893 A1* | 5/2019 | Khosravirad ..... | H03M 13/6306 |
| 2019/0363833 A1 | 11/2019 | Wang | |
| 2019/0386781 A1 | 12/2019 | Lin | |
| 2020/0195386 A1 | 6/2020 | Marinier et al. | |
| 2020/0374043 A1 | 11/2020 | Lei | |
| 2022/0030560 A1* | 1/2022 | Hosseinian .......... | H04L 1/1835 |

FOREIGN PATENT DOCUMENTS

| | | |
|---|---|---|
| JP | 2019537125 A | 12/2019 |
| RU | 2470467 C2 | 12/2012 |
| RU | 2547696 C2 | 4/2015 |
| RU | 2564639 C2 | 10/2015 |
| WO | 2010109521 A1 | 9/2010 |
| WO | 2011100681 A1 | 8/2011 |
| WO | 2014031450 A2 | 2/2014 |
| WO | 2018075995 A1 | 4/2018 |
| WO | 2018204491 A1 | 11/2018 |

OTHER PUBLICATIONS

3GPP TSG RAN WG1 Meeting #88, Athens, Greece, Feb. 13-17, 2017, R1-1702990, Agenda Item: 8.1.3.3.1, Source: Samsung, Title: CB-group based retransmission for eMBB. (Year: 2017).*
3GPP TSG RAN WG1 Meeting #88, Athens, Greece, Feb. 13-17, 2017, R1-1702745, Agenda Item: 8.1.3.4.1, Source: MediaTek Inc., Title: URLLC and eMBB DL Multiplexing using CRC masking and multi-bit NACK feedback. (Year: 2017).*
3GPP TSG RAN WG1 Meeting #88, Athens, Greece, Feb. 13-17, 2017, R1-1703366, Agenda Item: 8.1.4.1, Source: Huawei, HiSilicon, Title: On CRC for LDPC design. (Year: 2017).*
Huawei et al., "On CRC for LDPC design", 3GPP TSG RAN WG1 Meeting #88, R1-1703366, Feb. 13-17, 2017, Athens, Greece.
Mediatek Inc., "URLLC and eMBB DL Multiplexing using CRC masking and multi-bit NACK feedback", 3GPP TSG RAN WG1 Meeting #88, R1-1702745, Feb. 13-17, 2017, Athens, Greece.
Samsung, "CB-group based retransmission for eMBB", 3GPP TSG RAN WG1 Meeting #88, R1-1702990, Feb. 13-17, 2017, Athens, Greece.
LG Electronics, Discussion on CB group based HARQ-ACK feedback, R1-1704918, 3GPP TSG RAN WG1 Meeting #88bis Spokane, USA Apr. 3-7, 2017.
Early Hybrid ARQ Feedback for the 5G New Radio, 3GPP TSG-RAN WGI#87 R1-1612249, Nokia,Alcatel-Lucent Shanghai Bell, Reno, NV, USA, Nov. 14-18, 2016.
Ericsson, "On Retransmission Decoder Throughput Issues and CBG-based HARQ Protocol", 3GPP TSG-RAN WG1 Meeting #89, R1-1709109, Hangzhou, P.R. China May 15-19, 2017.
Ericsson, "Throughput Requirements of LDPC Decoder", 3GPP TSG RAN WG1 Meeting #89, R1-1707069, Hangzhou, P.R. China, May 15-19, 2017.
Huawei et al. "Discussion on CBG-based Feedback and Retransmission", R1-1705066,3GPP TSG RAN WG1 Meeting #88bis m Spokane, USA, Apr. 3-7, 2017.
Qualcomm Incorporated, "UCI content", 3GPP TSG-RAN WG1 #87, R1-1612072, Nov. 14-18, 2016, Reno, USA.
Way forward on UE behavior for large Transport Blocks, LG Electronics, Qualcomm, Alcatel-Lucent Shanghai Bell, 6 Fujitsu, New Postcom, R1-123856,Aug. 16, 2012.

* cited by examiner

HARQ HANDLING FOR NODES WITH VARIABLE PROCESSING TIMES

RELATED APPLICATIONS

This application is a continuation of co-pending U.S. patent application Ser. No. 16/482,829 filed on Aug. 1, 2019, which is a 371 of International Application No. PCT/IB2018/052266 filed on Apr. 2, 2018 which claims benefit to U.S. Patent Application No. 62/481,048 filed Apr. 3, 2017, the disclosures of which are incorporated herein by reference in their entireties.

BACKGROUND

The following sections provide an overview of certain features of wireless communication systems, such as HARQ operations, transport block segmentation, and low-density parity-check (LDPC) codes.

Hybrid Automatic Repeat Request (HARQ) Operations

Modern wireless communication systems such as HSPA (High Speed Packet Access), LTE (Long Term Evolution) and NR (5G New Radio) employ a Hybrid ARQ (Automatic Repeat ReQuest) protocol in their MAC (Medium Access Control) layer. HARQ protocol is used to enhance transmission reliability.

In an LTE system, a wireless device, such as a user equipment (UE), is notified by the network of downlink data transmission by the physical downlink control channel (PDCCH). Upon reception of a PDCCH in a particular subframe n, a UE is required to decode the corresponding physical downlink share channel (PDSCH) and to send acknowledgement (ACK)/negative acknowledgement (NACK) feedback in a subsequent subframe n+k. FIG. 1 illustrates example HARQ operations in LTE. A transmitter may communicate downlink data on time transmission intervals (TTIs). The receiver may receive the data and respond to the with ACK/NACK feedback that informs the eNodeB whether the corresponding PDSCH was decoded correctly. In the example of FIG. 1, the transmitter transmits two consecutive TTIs, TTI1 and TTI2. If the receiver, such as a network node, e.g., eNB, or a wireless device, e.g., a UE, is unable to decode the data, it may send HARQ feedback to the transmitter indicating that the data was not decoded, e.g., NACK feedback. On the other hand, if the receiver is able to decode the data successfully, it may indicate ACK feedback. For example, the illustrated example shows the receiver sending NACK for the data transmitted in TTI1 and ACK for data transmitted in TTI2. When the transmitter, e.g., a eNodeB, detects an ACK feedback, it can proceed to send new data blocks to the UE. When a NACK is detected by the eNodeB, coded bits corresponding to the original data block will be retransmitted. When the retransmission is based on repetition of previously sent coded bits, it is said to be operating in a Chase combining HARQ protocol. When the retransmission contains coded bits unused in previous transmission attempts, it is said to be operating in an incremental redundancy HARQ protocol.

An important part of hybrid ARQ protocol is the use of soft combining. With soft combining the receiver (a terminal in case of downlink transmissions) does not discard soft information in case it cannot decode a data block as in traditional hybrid ARQ protocols, but combines soft information from previous transmission attempts with the current retransmission to increase the probability of successful decoding. It is well-known that using soft information is useful for increasing the probability of successful decoding. It is further well-known that the soft combining gains can be significantly enhanced if the HARQ protocol is operated in the incremental redundancy mode, where new coded bits are sent in retransmissions, rather than in the Chase combining mode, where the original coded packet is simply repeated in retransmissions.

To reduce the complexity of retransmission signaling, LTE defines redundancy versions (RVs) for the coded bits. In a downlink retransmission, the evolved Node B (eNB) indicates which set of coded bits are included by providing the redundancy version.

Transport Block Segmentation

In modern high data rate communications systems, a large amount of data bits are transmitted at a time in a unit of a transport block (TB). Since it is impractical to implement forward error correction channel codecs of very large block lengths, it is necessary to divide a large TB into multiple smaller units called code blocks (CB). This procedure is illustrated in FIG. 2. The individual CBs are then encoded and decoded independently.

In LTE protocol, one HARQ feedback bit is provisioned for each transport block. The receiver will send back an ACK if all code blocks in the transport block are correctly decoded. If any of the code blocks in the transport block is not decoded correctly by the receiver, a NACK feedback is provided to the transmitter. With such feedback, retransmissions will contain coded bits for the entire transport block. It can be observed that, if a code block was already decoded by the receiver, the retransmitted coded bits for such a code block is of no use to the receiver.

With the 5G NR system, the standard is designed to support communication links with data rate exceeding tens of Gbps. As a result, a transport block may contain more than a hundred code blocks. HARQ protocol can be enhanced by allowing multiple HARQ feedback bits per transport block. The code blocks are organized into G code block groups (CBG), where the number G is configured by the network. One HARQ feedback bit is provisioned for each code block group. The receiver can send back G HARQ feedback bits for the transport block. Based on such feedback, the transmitter can retransmit coded bits only for the code block groups with NACK feedbacks from the receiver. This enhanced protocol is referred to as the CBG based HARQ protocol.

Ldpc Code

The NR data channel uses low-density parity-check (LDPC) codes suitable for incremental redundancy retransmissions. A basic structure of the parity-check matrix is shown in FIG. 3.

NR LDPC codes are quasi-cyclic protograph-based codes. Quasi-cyclic parity-check matrices are partitioned into square sub-blocks (sub-matrices) of size Z×Z. These sub-matrices are either cyclic-permutations of the identity matrix or null submatrices. The first 0, 1 or 2×Z systematic information bits are always punctured (the set of bits corresponding to the vertically striped columns of the parity check matrix (PCM)). Some of the remaining systematic bits are always transmitted, while some of them may be shortened. The parity-check matrix of a quasi-cyclic LDPC code is conveniently described through a base matrix, which is a matrix where each integer i denotes the shift of a Z×Z cyclic-permutation matrix.

The overlayed square shows the part of the base matrix that correspond to the high-rate code. The rate may be reduced by transmitting additional parity bits, as described by the rightmost part of the matrix. Check-nodes connected to the variable-nodes of the incremental redundancy part that are not transmitted can be deactivated when decoding to reduce complexity. This implies that the decoding latency depends on the code rate, since a larger parity-check matrix is used for lower code rates.

The received data may be decoded by a row-parallel or a block-parallel decoder. A row-parallel decoder handles one row (or a layer consisting of several mutually orthogonal rows) of the base matrix at a time and the decoding latency is proportional to the number of rows (or layers) of the base matrix. A block-parallel decoder handles one or several non-zero Z×Z sub-blocks of the parity-check matrix at a time. The decoding latency is thereby proportional to the number of non-zero sub-blocks in the parity-check matrix, under the assumption that memory conflicts can be avoided.

Because of the increased decoding latency, a combination of additional parity bits and repetition is used for very low code rates. The parity-check matrix for the NR data channel is not defined for code rates lower than Rmin, where Rmin is in the range $1/5 \leq R\_mins \leq 1/3$. The code rate Rmin is similar to the mother code rate of the LTE Turbo codes, since it is the lowest code rate that is achieved without repetition.

Certain characteristics of the PCM have been discussed for NR. According to a 3GPP agreement from RAN1 NR AdHoc:

The rate matching for LDPC code is circular buffer based (same concept as in LTE)
The circular buffer is filled with an ordered sequence of systematic bits and parity bits
FFS: Order of the bits in the circular buffer
For IR-HARQ, each Redundancy Version (RV), RVi, is assigned a starting bit location Si on the circular buffer
For IR retransmission of RVi, the coded bits are read out sequentially from the circular buffer, starting with the bit location Si
Limited buffer rate matching (LBRM) is supported Note that the punctured systematic bits can be transmitted in a later transmission. This can be accomplished for example by adding them to the circular buffer, but letting the starting bit location S0 for the initial transmission be larger than 0.

SUMMARY

According to certain embodiments, a method for use in a transmitter comprises sending a transmission comprising a transport block (TB) comprising a plurality of code blocks (CBs) arranged in one or more code block groups (CBGs). Each code block group comprises one or more code blocks and each code block comprising a plurality of coded bits. The transmission is sent to a receiver configured to use multi-bit hybrid automatic repeat request (HARQ) feedback per transport block. The method further comprises receiving HARQ ACK or NACK feedback from the receiver for one or more of the one or more code block groups of the transport block. The method further comprises determining a number of code blocks or code block groups to send to the receiver in a retransmission based on at least the received HARQ ACK or NACK feedback.

According to certain embodiments, a computer program product comprises a non-transitory computer readable storage medium storing computer readable program code. The computer readable program comprises program code for sending a transmission comprising a transport block (TB) comprising a plurality of code blocks (CBs) arranged in one or more code block groups (CBGs). Each code block group comprising one or more code blocks and each code block comprising a plurality of coded bits. The transmission is sent to a receiver configured to use multi-bit hybrid automatic repeat request (HARQ) feedback per transport block. The computer readable program further comprises program code for receiving HARQ ACK or NACK feedback from the receiver for one or more of the one or more code block groups of the transport block. The computer readable program further comprises program code for determining a number of code blocks or code block groups to send to the receiver in a retransmission based on at least the received HARQ ACK or NACK feedback.

According to certain embodiments, a transmitter comprises one or more interfaces, memory, and processing circuitry. The processing circuitry is configured to execute instructions stored in the memory, whereby the transmitter is configured to send a transmission comprising a transport block (TB) comprising a plurality of code blocks (CBs) arranged in one or more code block groups (CBGs). Each code block group comprising one or more code blocks and each code block comprising a plurality of coded bits. The transmission is sent to a receiver configured to use multi-bit hybrid automatic repeat request (HARQ) feedback per transport block. The transmitter is further configured to receive HARQ ACK or NACK feedback from the receiver for one or more of the one or more code block groups of the transport block. The transmitter is further configured to determine a number of code blocks or code block groups to send to the receiver in a retransmission based on at least the received HARQ ACK or NACK feedback.

Each of the embodiments of the method, computer program product, and transmitter above may include one or more of the following features:

In certain embodiments, HARQ NACK feedback is received for each of the one or more CBGs when the TB fails a TB cyclic redundancy check in the receiver. In some embodiments, determining the number of CBs or CBGs comprises sending all CBGs of the TB to the receiver in the retransmission. In some embodiments, determining the number of CBs or CBGs comprises sending a subset of CBGs of the TB to the receiver in the retransmission.

In certain embodiments, determining the number of code blocks or code block groups in the retransmission is further based on a decoding time of the receiver to decode the received code blocks of the transport block.

In certain embodiments, determining the number of CBs or CBGs comprises reducing the number of CBs in the retransmission such that only a subset of CBs or only a subset of CBGs in the TB for which HARQ NACK feedback has been received are retransmitted.

In certain embodiments, the method/computer program product/transmitter further comprises reducing a number of CBs or CBGs to send to the receiver in one or more timeslots after the retransmission.

In certain embodiments, the method/computer program product/transmitter further comprises receiving an incomplete decoding indication feedback from the receiver. The method/computer program product/transmitter further comprises, in response to receiving the incomplete decoding indication feedback from the receiver, adjusting a number of CBs or CBGs to send in the retransmission, deciding to not send the retransmission, or delaying sending the retransmission.

In certain embodiments, the method/computer program product/transmitter further comprises signaling one or more indications to the receiver, the one or more indications providing information from which the receiver can determine a first number of CBGs of the TB to respond to with acknowledgement (ACK) or negative acknowledgement (NACK) feedback based on feedback of unsuccessfully decoded CBs or CBGs in a previous transmission.

In certain embodiments, the one or more indications are configured to cause the receiver to perform any of the methods described above.

In certain embodiments, the method/computer program product/transmitter further comprises indicating to the receiver which code block groups of the one or more CBGs are in the retransmission.

In certain embodiments, the method/computer program product/transmitter further comprises comprising sending the receiver one or more settings for HARQ feedback timing. In some embodiments, the one or more settings are sent dynamically via a downlink control channel. In some embodiments, the one or more settings configure HARQ feedback timing for the retransmission to be longer than HARQ feedback timing for the transmission.

According to certain embodiments, a method for use in a receiver comprises configuring the receiver to use multi-bit hybrid automatic repeat request (HARQ) feedback per transport block (TB). The method further comprises receiving a transmission comprising a TB that is composed of a plurality of code blocks (CBs) arranged in one or more code block groups (CBGs). The method further comprises sending HARQ ACK or NACK feedback for one or more of the one or more CBGs of the TB, based on the decoding status of the TB.

According to certain embodiments, a computer program product comprises a non-transitory computer readable storage medium storing computer readable program code. The computer readable program comprises program code for configuring the receiver to use multi-bit hybrid automatic repeat request (HARQ) feedback per transport block (TB). The computer readable program further comprises program code for receiving a transmission comprising a TB that is composed of a plurality of code blocks (CBs) arranged in one or more code block groups (CBGs). The computer readable program further comprises program code for sending HARQ ACK or NACK feedback for one or more of the one or more CBGs of the TB, based on the decoding status of the TB.

According to certain embodiments, a receiver comprises one or more interfaces, memory, and processing circuitry. The processing circuitry is configured to execute instructions stored in the memory, whereby the transmitter is configured to configure the receiver to use multi-bit hybrid automatic repeat request (HARQ) feedback per transport block (TB). The transmitter is further configured to receive a transmission comprising a TB that is composed of a plurality of code blocks (CBs) arranged in one or more code block groups (CBGs). The transmitter is further configured to send HARQ ACK or NACK feedback for one or more of the one or more CBGs of the TB, based on the decoding status of the TB.

Each of the embodiments of the method, computer program product, and receiver above may include one or more of the following features:

In certain embodiments, the method/computer program product/receiver further comprises receiving a retransmission comprising only a subset of CBs or only a subset of CBGs of the TB for which HARQ NACK feedback was sent.

In certain embodiments, the method/computer program product/receiver further comprises providing HARQ NACK feedback for each of the CBGs when the TB fails a TB cyclic redundancy check in the receiver. In some embodiments, the method/computer program product/receiver further comprises receiving a re-transmission of all CBs or CBGs of the TB. In some embodiments, the method/computer program product/receiver further comprises receiving a re-transmission of a subset of the CBs or CBGs of the TB.

In certain embodiments, determining the HARQ ACK or NACK feedback comprises sending NACK feedback for a first subset of CBGs of the one or more CBGs of the TB. The first subset comprises CBGs that include one or more unsuccessfully decoded CBs as determined at a first HARQ feedback occasion. In some embodiments, the first subset of code block groups does not include CBGs for which decoding has not been completed by the first HARQ feedback occasion.

In certain embodiments, the method/computer program product/receiver further comprises providing an indication to the transmitter that decoding of a transport block is not completed. In some embodiments, the method/computer program product/receiver further comprises, in addition to providing the indication to the transmitter that decoding of a transport block is not completed, sending NACK feedback for code block groups of the transport block for which decoding is not finished.

In certain embodiments, the method/computer program product/receiver further comprises determining a set of CBGs of the TB for which to send negative acknowledgement (NACK) feedback at a different HARQ feedback occasion based on at least a decoding time for unsuccessfully decoded information received from previous transmissions and retransmissions.

In certain embodiments, determining the HARQ ACK or NACK feedback for each CBG of the TB is further based on an overall decoding load at the receiver. In some embodiments, the receiver receives data from more than one serving cell or bandwidth slice. The overall decoding load is based on decoding loads from received data from each serving cell or bandwidth slice. In some embodiments, the receiver is receiving data from more than one connected wireless node. The overall decoding load is based on decoding loads from received data from each wireless node.

In certain embodiments, the method/computer program product/receiver further comprises sending ACK feedback for one or more undecoded or unsuccessfully decoded code block groups. In some embodiments, a number of undecoded or unsuccessfully decoded code block groups for which ACK feedback is sent is based on one or more of a receiver capability, a decoder latency of the receiver, a code rate of a transmission, and a number of code blocks in a code block group.

In certain embodiments, the method/computer program product/receiver further comprises receiving a retransmission comprising a TB that includes a plurality of CBs arranged in one or more CBGs. The method/computer program product/receiver further comprises sending ACK or NACK feedback for the retransmission according to a HARQ feedback timing. The HARQ feedback timing is based on a number of CBs or a number of CBGs that were received in the retransmission. Certain embodiments of the present disclosure may provide one or more technical advantages. For example, certain embodiments A technical advantage of certain embodiments may be enhanced system performance. For example, certain embodiments may avoid unnecessary retransmissions. This may allow for more efficient use of radio resources and/or reduce interference caused by unnecessary retransmissions. As another example, certain embodiments permit a transmitter to adjust the transmission of a transport block, or its constituent code blocks or code block groups, to accommodate the decoding status of a receiver. In this manner, the optimal amount of data may be retransmitted without unnecessarily burdening the receiver with an unnecessary coding load. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
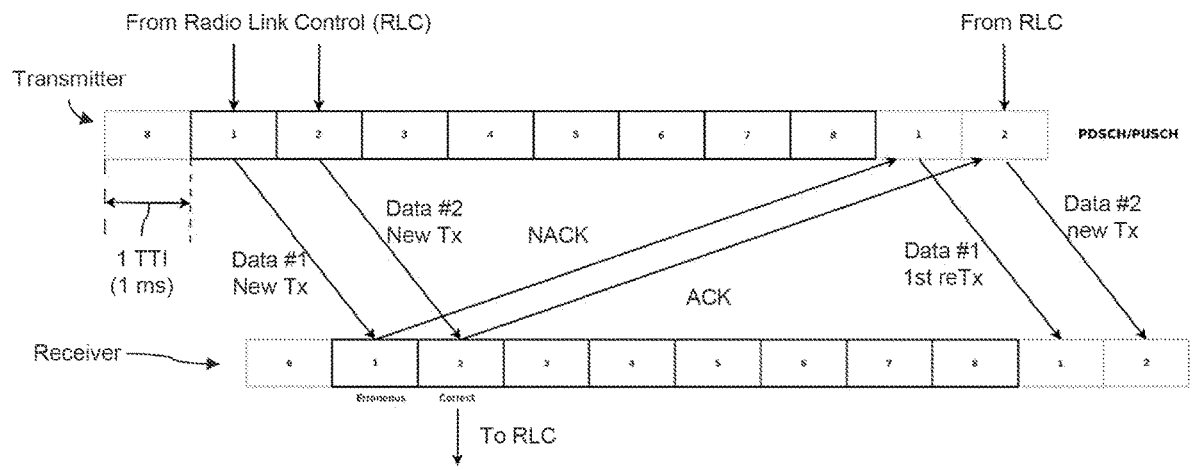
FIG. 1 illustrates an example HARQ sequence between a transmitter and a receiver, in accordance with certain embodiments.
Figure 2:
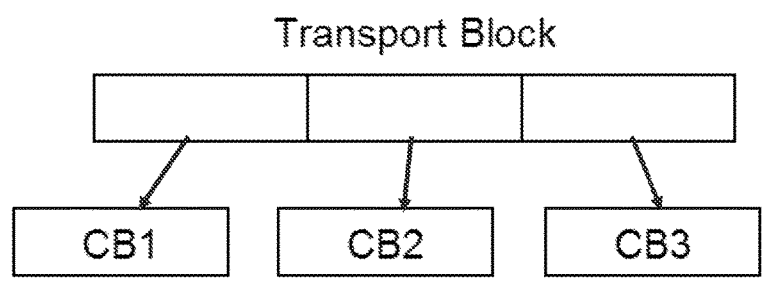
FIG. 2 illustrates an example division of a transport block into one or more code blocks, in accordance with certain embodiments.
Figure 3:
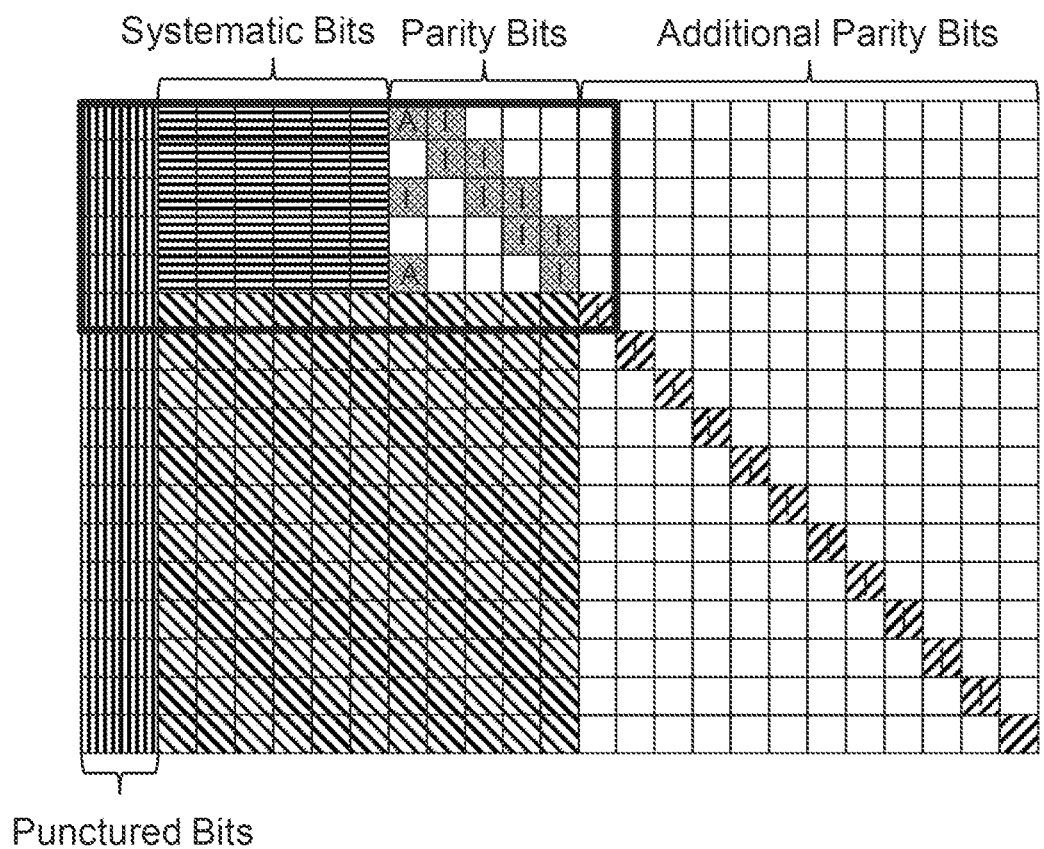
FIG. 3 is illustrates an example low density parity check code matrix for use in radio communications, in accordance with certain embodiments.

Even with the introduction of multiple HARQ feedback bits per transport block, certain problems can be envisioned with known HARQ retransmission procedures. For example, for high performance incremental redundancy retransmission, the receiver may not finish decoding the combined received signals in the same duration as that for decoding the initial transmission. As an example, assume that 10 Gbps is transmitted to a receiver using rate 8/9. If a code block is not decoded successfully, the code rate of said code block becomes 4/9 after combining with the received signals from a retransmission. The latency for decoding the rate 4/9 codeword is around 3 times higher than for decoding the rate 8/9 codeword. Therefore, the receiver cannot finish decoding with the same decoding time as the initial transmission if more than 1/3 of the CBs are incorrect in the initial transmission. The receiver will then provide NACK feedback to the transmitter because it cannot finish decoding. This will cause the transmitter to perform additional retransmissions. However, most of the data in the 3rd or 4th transmissions from the transmitter are not really used or needed by the receiver because the receiver does not need further retransmission of the coded bits, but only more decoding time. The retransmissions may only consume radio resources and interference budget in the system without communicating additional data or facilitating decoding of the coded bits Moreover, the code rate in the example may be is further reduced to 2/9 if a third retransmission is needed. Accordingly, the decoding latency of the combined codeword with this code rate is almost 6 times higher than the initial transmission, if incremental redundancy is used for the retransmission.

Certain embodiments of the present disclosure may provide solutions to these problems. For example, certain embodiments avoid unnecessary retransmissions of data caused by high decoding latency of retransmissions with low code rate.

In certain embodiments, based on at least receiver decoding time consideration:
  A receiver provides different HARQ feedback
  A transmitter sends different coded bits for retransmissions and, in some cases, does not send a retransmission.
  A transmitter may further adjust transmissions in time slots after a time slot used for retransmissions.

Certain embodiments may provide one or more technical advantages. A technical advantage of certain embodiments may be enhanced system performance. For example, certain embodiments may avoid unnecessary retransmissions. This may allow for more efficient use of radio resources and/or reduce interference caused by unnecessary retransmissions. Certain embodiments may have all, some, or none of these technical advantages. Other advantages may be apparent to those of ordinary skill in the art.

Receiver Embodiments 1.1 CBG Based HARQ Protocol

If a receiver is configured to use multi-bit HARQ feedback per TB (such as the CBG HARQ protocol), the receiver may adjust the number of code block groups to send NACK feedbacks based on at least the decoding time of combined soft information from multiple transmissions. For example, the receiver may adjust the number of code block groups in one or more of the following ways:
  The receiver may send NACK feedbacks for a subset of the code block groups that has incorrect code blocks.
  The receiver may send NACK feedbacks for different subsets of the code block groups that has incorrect code blocks at different HARQ feedback occasions.
    Said different subsets of said code block groups may be disjoint or partially overlapping at said different HARQ feedback occasions. For example, the receiver may adjust the number of code block groups differently based on the characteristics of the code block groups received at that time and/or based on the decoding load at the receiver at that particular instant.
  The receiver may send ACK for one or more incorrectly received CBG.
    The multi-bit HARQ feedback may contain at least one NACK bit for a CBG.

The number of CBGs where the receiver chooses to send ACK for incorrectly received CBG may be allowed to vary according to a variety of parameters including:

Receiver capability, specifically, decoder latency of the receiver;
Code rate used in the first HARQ transmission;
The number of CBs in a CBG;

If the receiver has resources for parallel processing of several codewords, it may also take the overall decoding load into account. If the load is low, the higher decoding latency of some low rate codewords can be handled.

If the receiver is a wireless device, such as a UE, receiving data from more than one serving cell or bandwidth part, said taking the overall decoding load into account considers decoding loads from all serving cells or bandwidth parts.

If the receiver is a network node, such as a Next Generation NodeB (gNB), receiving data from more than one connected devices, said taking the overall decoding load into account considers decoding loads for receiving from all connected devices.

1.2 Harq Protocol with Auxiliary Information

In certain embodiments, the receiver provides an indication feedback that decoding of the transport block is not completed. For example, the receiver may indicate to a transmitter of the transport block that decoding of the previously received transport block is not yet completed. The transmitter may adjust its transmission or retransmission based on the indication. In some embodiments, said incomplete decoding indication feedback is sent in addition to normal HARQ feedback. In other embodiments, said incomplete decoding indication feedback is sent in lieu of normal HARQ feedback. In some embodiments, the receiver may provide normal HARQ feedback at a later HARQ feedback occasion. For example, the receiver may delay or retransmit normal HARQ feedback at a later HARQ feedback occasion for the completed decoded transport block.

Transmitter Embodiments 2.1 General HARQ Protocol

In certain embodiments, the transmitter adjusts the amount of coded bits to send to the receiver in a retransmission based on at least the receiver decoding time of combined soft information from multiple transmissions.

In particular embodiments, the transmitter may reduce the amount of coded bits to send in said retransmission. For example, in some embodiments, reducing the amount of coded bits includes allocating smaller amount of radio resources. As a specific example, the smaller amount of radio resources is smaller than the amount of radio resources allocated for the initial transmission.

In certain embodiments, the transmitter adjusts the amount of data to send to the receiver in the time slot after a time slot used for retransmission based on at least the receiver decoding time of combined soft information from multiple transmissions. For example, in some embodiments, the transmitter reduces the amount of data to send to said receiver in said time slot after a time slot used for retransmission. In some embodiments, the transmitter does not send data to said receiver in said time slot after a time slot used for retransmission. In particular embodiments, the transmitter does not send data to said receiver in more than one time slot after a time slot used for retransmission. In this manner, the transmitter may adjust the amount of data to send to the receiver to allow the receiver to decode the coded bits it has already received without unnecessarily using radio resources.

2.2 CBG Based HARQ Protocol

In certain embodiments, a receiver is configured to use multi-bit HARQ feedback (such as the CBG HARQ protocol). Accordingly, the transmitter may adjust the number of code block groups to send coded bits for retransmission based on at least the receiver decoding time of combined soft information from multiple transmissions.

In certain embodiments, in a retransmission, the transmitter may send coded bits from a subset of the code block groups that were indicated as NACK in the HARQ feedback received from the receiver. For example, the transmitter may refrain from retransmitting the entire transport block and instead, only retransmit code block groups that were undecoded or unsuccessfully decoded, as indicated by the NACK feedback for those code block groups. If the receiver only sends NACK feedback for unsuccessfully decoded code block groups (or for code block groups containing unsuccessfully decoded coded bits), then transmitter may only retransmit those unsuccessfully decoded code block groups without retransmitting code block groups yet to be decoded at the receiver. In some embodiments, the transmitter indicates which subset of the code block groups is contained in said retransmission. In this manner, the receiver may correlate the retransmitted code block groups with prior transmissions.

2.3 HARQ Protocol with Auxiliary Information

In certain embodiments, the transmitter does not send retransmission in response to an incomplete decoding indication feedback from the receiver. For example, the transmitter may delay retransmission of a transport block (or subset of constituent code block groups) until the transmitter has received complete HARQ feedback from the receiver.

In certain embodiments, the transmitter may request HARQ feedback from the receiver at a later HARQ feedback occasion. For example, the transmitter may request HARQ feedback after a predetermined period of time or after a number of HARQ feedback occasions. In this manner, the transmitter may allow the receiver to decode the entire transport block before being requested to provide HARQ feedback.

Network Embodiments for Controlled Transmission

In LTE or NR systems, the uplink (UL) transmission is under the network scheduling control. Additional embodiments are provided for the network.

3.1 General HARQ Protocol

In certain embodiments, the network may adjust the amount of data the wireless device, e.g., the UE, shall transmit to the network in the time slot after a time slot in which the network requests the UE to send UL retransmission based on at least the network decoding time of combined soft information from multiple transmissions.

In certain embodiments, the network reduces the amount of data the UE shall transmit to the network in said time slot after a time slot used for UL retransmission.

In certain embodiments, the network does not schedule the UE to transmit to the network in said time slot after a time slot used for UL retransmission.

In certain embodiments, the network does not schedule the UE to transmit to the network in more than one time slot after a time slot used for UL retransmission 3.2 CBG Based HARQ Protocol In certain embodiments, if a UE is configured to use multi-bit HARQ feedback (such as the CBG HARQ protocol), the network may adjust the number of code block groups for which the network requests the UE to retransmit to the network based on at least the receiver decoding time of combined soft information from multiple transmissions.

In certain embodiments, the network requests a subset of the code block groups that has incorrect code blocks.

In certain embodiments, the network requests different subsets of the code block groups that has incorrect code blocks for different scheduled retransmission occasions. In some embodiments, said different subsets of said code block groups may be disjoint or partially overlapping for said different scheduled retransmission occasions. In some embodiments, the number of code block groups where the network requests a retransmission is allowed to vary according to parameters including:
  Network receiver capability, specifically, decoder latency of the receiver;
  Code rate used in the first HARQ transmission; and
  The number of CBs in a CBG.

Embodiments for HARQ Feedback Timings

In certain embodiments, different HARQ feedback timings may be used based on at least the receiver decoding times.
4.1 General HARQ Protocol In certain embodiments, said different HARQ feedback timings include using a shorter HARQ feedback timing for initial transmission and a longer HARQ feedback timing for retransmissions.

In certain embodiments, said different HARQ feedback timings include using a shorter HARQ feedback timing for Chase combining retransmissions and a longer HARQ feedback timing for incremental redundancy retransmissions.

In certain embodiments, said different HARQ feedback timings include using a shorter HARQ feedback timing for retransmitting a redundancy version that had been transmitted previously and a longer HARQ feedback timing for retransmitting a redundancy version that had not been transmitted previously.

In certain embodiments, said different HARQ feedback timings include using a shorter HARQ feedback timing for transmissions including fewer coded bits (including both first transmission and retransmissions with incremental redundancy), and longer HARQ feedback timing for transmissions including more coded bits.

In certain embodiments, said different HARQ feedback timings include using a shorter HARQ feedback timing for transmissions with high code rate (including both first transmission and retransmissions with incremental redundancy) and a longer HARQ feedback timing for transmissions with lower code rate.
4.2 CBG Based HARQ Protocol In certain embodiments, said different HARQ feedback timings include using a shorter HARQ feedback timing for retransmissions of small numbers of code block groups and a longer HARQ feedback timing for retransmissions of large number of code block groups. In this manner, the HARQ feedback timing may be based on the estimated time to decode based on the number of code block groups.
4.3 Network Embodiments In certain embodiments, said different HARQ feedback timings are set by the network via dynamic signaling. A nonlimiting example includes setting said HARQ feedback timings in the downlink control channel.

In certain embodiments, said different HARQ feedback timings are set by the network via semi-static configuration. A nonlimiting example includes setting said HARQ feedback timings via radio resource control layer configuration.

Decoding Time Determination Embodiments

Decoding time may be based on whether the system adopts a Chase combining or incremental redundancy retransmission policy. With incremental redundancy retransmissions, decoding time is typically increased. For an initial retransmission, the decoding time of a LDPC code word may be significantly affected by the parity check matrix associated with the code rate being used. Lower code rate transmissions are generally associated with a parity check matrix comprising with more rows and columns, and more edges to process in one iteration.

When considering the total number of iterations that the decoder runs, and the effect of HARQ retransmission, other factors may also affect the overall decoding time of a TB. For example, following factors may help to reduce the decoding time of a TB:
  If only a subset of the CBGs are wrong, then the decoding time of the subset of CBGs may be proportionally reduced compared to decoding all CBGs of a TB
  For a given CBG that is retransmitted, the receiver may also further reduce latency by only decoding the incorrect CBs, and ignoring received signals corresponding to previously correctly received CBs, since each CB has its own error detection capability
  In certain embodiments, early termination of decoder is used (e.g., via the parity check matrix). If link adaptation reasonably accurate, then most CBs should converge fast and do not require the maximum number of decoding iterations. In this case, only a few CBs may require the max number of decoding iterations. This effect should be more prominent when there are more CBs in a TB. Accordingly, using early termination may lessens the long latency problem of a large TB
  In HARQ retransmission (either IR or Chase combining), the decoding may be more likely to converge. For example, when the initial transmission has poor SNR, then decoder may take max number of iterations allowed (e.g., 20 iterations). When the effective SNR is improved in retransmission, the decoder may take fewer iteration to converge (e.g., <5 iterations). Fewer decoding iterations may then correspond to lower decoding latency.

Even with the above factors taken into account, there are still scenarios where the receiver does not have enough time to finish decoding an entire transport block before feedback is expected. For example, if the link adaptation at a network node, e.g., a gNB, is not up to date or is too coarse, then a TB may be transmitted with too high modulation and coding rate. As a result, the receiver may not correctly decode most or all of the CBs of the TB. This may cause the receiver to decode each CB using maximum number of iterations allowed, and still fail to decode most or all of the CBs. The most demanding case may occur when the TB is very large (at a max TB size or close), and the TB contains a max number of CBs.

The exact decoding time may then be related to many factors, including numerous decoder implementation choices. For example, decoding time may be related to one or more of the following factors:
  In certain embodiments, the decoding latency for a (re) transmission with code rate R, including both the transmission and any retransmissions, may be estimated based on at least the number of layers in the base matrix corresponding to code rate R. In some embodiments, all base matrix rows that are included in a layer are mutually orthogonal In certain embodiments, the decoding latency for a (re) transmission with code rate R, including both the transmission and any retransmissions, may be estimated based on at least the number of non-zero sub-blocks in the parity-check matrix corresponding to code rate R In certain embodiments, the decoding latency for a (re) transmission with code rate R, including both the transmission and any retransmissions, may be estimated based on at least a combination of the number of non-zero sub-blocks in the parity-check matrix corresponding to code rate R and the number of rows and/or number of layers in the base matrix In certain embodiments, the decoding time may be based on at least the total number of coded bits of a CB that have been transmitted, including all transmissions and retransmissions of the CB In certain embodiments, the decoding time may be based on at least the number of different redundancy versions that have been transmitted for a CB, including all transmissions and retransmissions of the codeword In certain embodiments, the decoding time may be based on at least the number of different columns in the base matrix for which coded bits have been transmitted for a CB In certain embodiments, the decoding time may be determined based on at least the number of different columns in the base matrix for which coded bits have been transmitted plus the number of columns associated with punctured systematic bits that are in the base matrix In certain embodiments, the decoding time may be based on at least the number of different rows in the base matrix that is used for decoding. In some embodiments, a row is included based on whether it is part of the high rate base matrix or if it is associated with an additional parity bit which has been transmitted In certain embodiments, the decoding time may be based on at least the number of columns in the base matrix corresponding to transmitted additional parity bits.

In certain embodiments, the decoding time may be based on at least the lifting factor Z.

In certain embodiments, the decoding latency for a (re) transmission with code rate R may be limited by the decoding latency for a transmission with code rate Rmin, which is the lowest code rate achieved through code extension and additional parity bits. A lower code rate may be achieved through a combination of additional parity bits and repetition of already transmitted bits.

In certain embodiments, the decoding latency for a (re) transmission with code rate R is estimated based on at least the parity-check matrix or base matrix with code rate max(R, Rmin).

For a retransmission including only new coded bits (no repetition), in certain embodiments, the decoding latency is estimated based on at least the parity-check matrix or base matrix corresponding to a code rate which is only half of the code rate of the original transmission.

In certain embodiments, the decoding latency for a (re) transmission with code rate R is estimated based on at least the parity-check matrix or base matrix with code rate corresponding to the maximum size of the soft buffer for each code block in the receiver. As an example, if the soft buffer can only store soft information for a code rate of 2/3 and higher, the decoding latency should be estimated based on the parity-check matrix or base matrix with code rate 2/3.

Further Embodiments

In the data transmission, it is possible that all CBGs pass error checking (e.g., using LDPC parity check matrix, CB-level CRC if defined, CBG-level CRC if defined), but the TB cyclic redundancy check (CRC) fails. When this happens, the receiver may not know which CBG, or which CB, is actually incorrect. For example, typically only one CBG is wrong, but the receiver may be unable to determine which one has incorrect code blocks. In such cases, the receiver may have no choice but to assume that all CBGs could be wrong, and request a retransmission.

In certain embodiments, the receiver requests retransmission of the entire TB by sending back all-NACK (i.e., NACK of every CBG) in HARQ response. When receiving such HARQ response, the transmitter may retransmit the full TB (using either incremental redundancy or chase combining) in the next transmission opportunity. Alternatively, in some embodiments, the transmitter retransmit a subset of the CBG of the full TB.

In certain embodiments, the receiver sends back HARQ response using methods described in previous embodiments detailed above. For example, the receiver may send back HARQ response where only a subset of the CBGs (CBG_subset1) are marked with NACK, while the rest of the CBGs (CBG_subset2) are marked with ACK. In some embodiments, the receiver may randomly select which CBGs are put into CBG_subset1 vs CBG_subset2. In other embodiments, the receiver may select the CBGs and their respective subset using certain criteria (e.g., based on channel estimation). When the receiver receives retransmission of CBGs in CBG_subset1, the receiver may perform decoding of CBG_subset1, and then combine the newly decoded CBGs in CBG_subset1 and previously decoded CBGs in CBG_subset2 to check TB-level CRC again.

Figure 4:
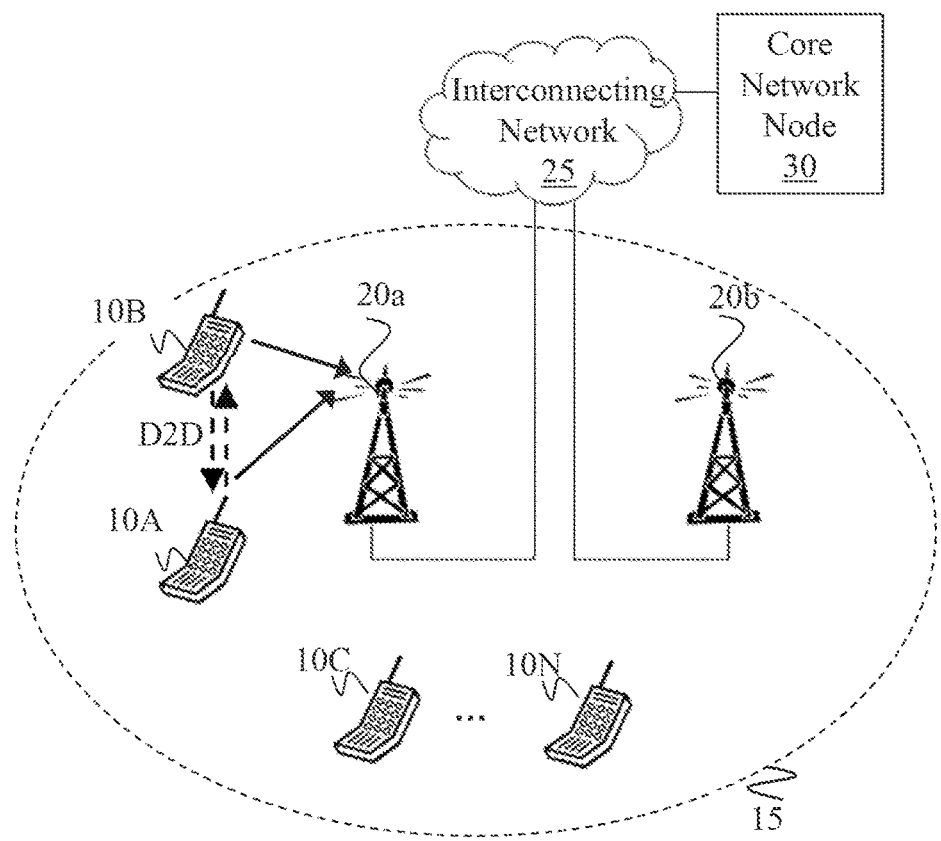
FIG. 4 is illustrates an example radio communications network, in accordance with certain embodiments.

FIG. 4 is a block diagram illustrating an example wireless network, in accordance with certain embodiments. The wireless network includes a plurality of nodes including wireless devices 10A-10N (which may interchangeably be referred to by the non-limiting term user equipment, UE) and network nodes, such as radio network nodes 20A-20B (e.g., eNBs, gNBs, base stations, etc.) and one or more core network nodes 30, which may communicate via an interconnecting network 25. Wireless devices 10 within coverage area 15 may each be capable of communicating directly with radio network nodes 20 over a wireless interface. In certain embodiments, wireless devices may also be capable of communicating with each other via device-to-device (D2D) communication.

As an example, wireless device 10A may communicate with radio network node 20A over a wireless interface. That is, wireless device 10A may transmit wireless signals and/or receive wireless signals from radio network node 20A. The wireless signals may contain voice traffic, data traffic, control signals, and/or any other suitable information. In some embodiments, an area of wireless signal coverage associated with a radio network node 20 may be referred to as a cell 15.

Wireless device 10 can be any type of wireless device capable of communicating with radio network nodes 20 or another wireless device/UE 10 over radio signals. Similarly, radio network node 20 can be any kind of radio network node capable of communicating with wireless device 10 or another network node. For example, the term network node may refer to radio network node 20, core network node 30, or even an external node (e.g., 3rd party node, a node external to the current network), etc. Example embodiments of wireless device 10 are described in more detail below with respect to FIGS. 5 and 6. Example embodiments of radio network node 20 are discussed below with respect to FIGS. 7 and 8.

In certain embodiments, radio network nodes 20 may interface with a radio network controller. The radio network controller may control radio network nodes 20 and may provide certain radio resource management functions, mobility management functions, and/or other suitable functions. In certain embodiments, the functions of the radio network controller may be included in radio network node 20. The radio network controller may interface with a core network node 30. In certain embodiments, the radio network controller may interface with the core network node 30 via an interconnecting network 25.

The interconnecting network 25 may refer to any interconnecting system capable of transmitting audio, video, signals, data, messages, or any combination of the preceding. The interconnecting network 125 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 30 may manage the establishment of communication sessions and various other functionalities for wireless devices 10. Examples of core network node 30 may include mobile switching center (MSC), MME, serving gateway (SGW), packet data network gateway (PGW), operation and maintenance (O&M), operations support system (OSS), SON, positioning node (e.g. Enhanced Serving Mobile Location Center, E-SMLC), MDT node, etc. Wireless devices may exchange certain signals with the core network node using the non-access stratum layer. In non-access stratum signaling, signals between wireless devices 10 and the core network node 30 may be transparently passed through the radio access network. In certain embodiments, radio network nodes 20 may interface with one or more network nodes over an internode interface. For example, radio network nodes 20A and 20B may interface over an X2 interface.

Figure 6:
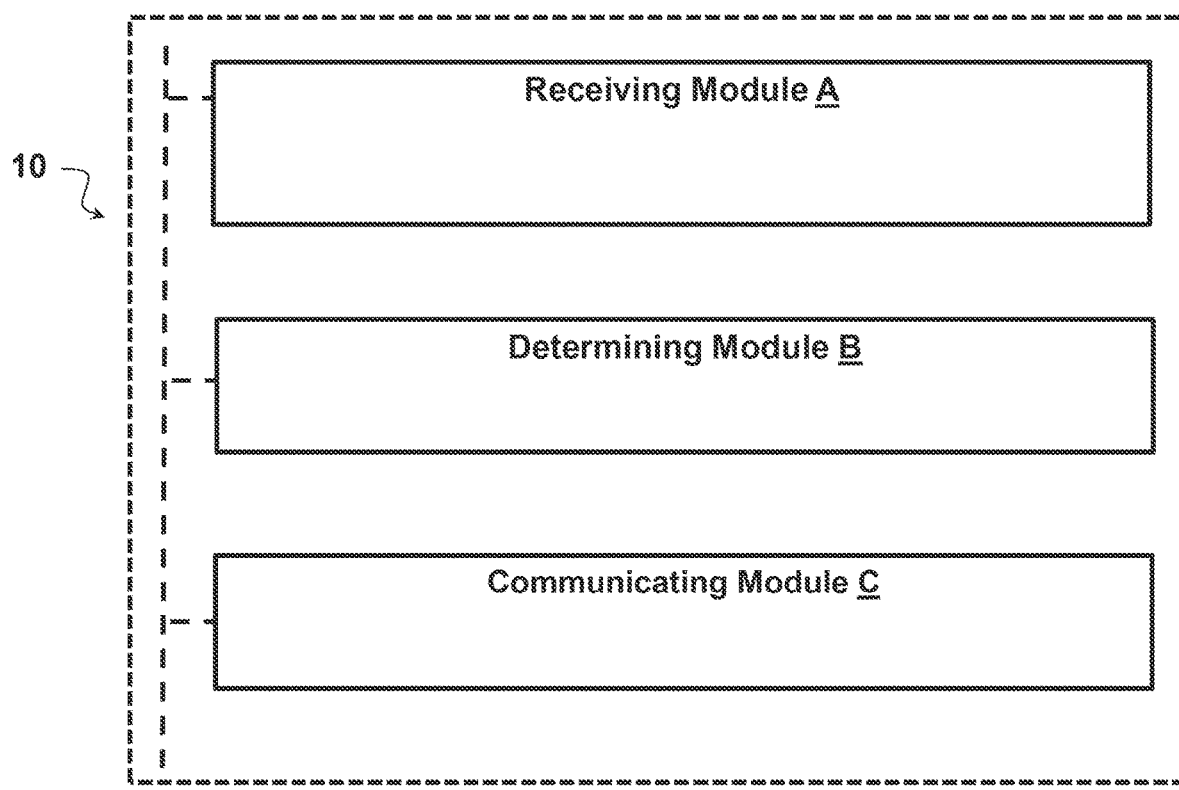
FIG. 6 is a block diagram illustrating examples of modules that may be included in the example wireless device, in accordance with certain embodiments.

Although FIG. 6 illustrates a particular arrangement of the network, the present disclosure contemplates that the various embodiments described herein may be applied to a variety of networks having any suitable configuration. For example, the wireless network may include any suitable number of wireless devices 10 and radio network nodes 20, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, certain embodiments may be applicable to LTE and/or 5G NR radio access technologies.

In certain embodiments, at least a portion of the wireless network may be configured for carrier aggregation.

Figure 5:
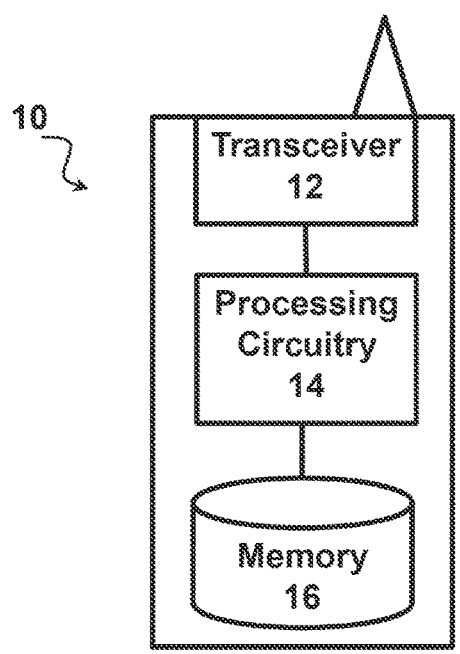
FIG. 5 is a block diagram of an example wireless device for use in a radio communications network, in accordance with certain embodiments.

FIG. 5 is a block diagram of a wireless device 10, in accordance with certain embodiments of the present disclosure. Wireless device 10 can correspond, for example, to the wireless device (or UE) described in the previous sections. Wireless device 10 includes a transceiver 12, processing circuitry 14, and memory 16. The transceiver 12 may comprise certain receiver and transmitter capabilities as described above. In some embodiments, the transceiver 12 facilitates transmitting wireless signals to and receiving wireless signals from radio network node 20 (e.g., via an antenna), the processing circuitry 14 executes instructions to provide some or all of the functionalities described herein as being provided by wireless device 10, and the memory 16 stores the instructions for execution by the processing circuitry 14.

The processing circuitry 14 may include any suitable combination of hardware and software implemented in one or more modules to execute instructions and manipulate data to perform some or all of the described functions of wireless device 10 (or UE), such as the functions of wireless device 10 (or UE) described above (including, e.g., performing methods described as being performed by a receiver or a transmitter). In some embodiments, the processing circuitry 14 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the processing circuitry 14 may comprise one or more of the modules discussed below with respect to FIG. 6.

The memory 16 is generally operable to store instructions, such as a computer program, software, an application including one or more of logic, rules, algorithms, code, tables, etc. and/or other instructions capable of being executed by a processing circuitry 14. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor of wireless device 10.

Other embodiments of wireless device 10 may include additional components beyond those shown in FIG. 5 that may be responsible for providing certain aspects of the wireless device's functionality, including any of the functionality described above and/or any additional functionality (including any functionality necessary to support the solution described above). As just one example, wireless device 10 may include input devices and circuits, output devices, and one or more synchronization units or circuits, which may be part of the processor. Input devices include mechanisms for entry of data into wireless device 10. For example, input devices may include input mechanisms, such as a microphone, input elements, a display, etc. Output devices may include mechanisms for outputting data in audio, video and/or hard copy format. For example, output devices may include a speaker, a display, etc.

FIG. 6 is a block diagram illustrating examples of modules that may be included in a wireless device 10, in accordance with certain embodiments of the present disclosure. In certain embodiments, radio network node 20 may include any one or more of: receiving module A, determining module B, communicating module C, and/or other suitable modules. The functionality of the modules may be integrated in a single component or separated among several components in any suitable manner. In certain embodiments, one or more of the modules may be implemented using processing circuitry 14 described with respect to FIG. 5.

In general, in certain embodiments, receiving module A may include any suitable interface and/or other circuitry to receive signaling (e.g., transmissions) from a network node. Determining module B may be operable to receive input from receiving module A and/or memory of wireless device 10, make determinations based on the input, and provide an output to communications module and/or to other modules of wireless device configured to act according to the determination. For example, determining module may determine to provide HARQ ACK/NACK feedback based on a determination whether the transmission was received successfully. In certain embodiments, determining module may further determine to adjust HARQ NACK feedback based on at least the decoding time of combined soft information from multiple transmissions. In certain embodiments, determining module may determine that decoding of a transport block is not completed and to provide a feedback indication informing the network node that decoding is not completed. Communications module C may be operable to send communications (such as HARQ ACK/NACK feedback or indication feedback received from determining module B) to the network node. The modules may be configured to receive (module A), determine (module B), and communicate (module C) additional or different information in order to support the various embodiments described herein.

Figure 7:
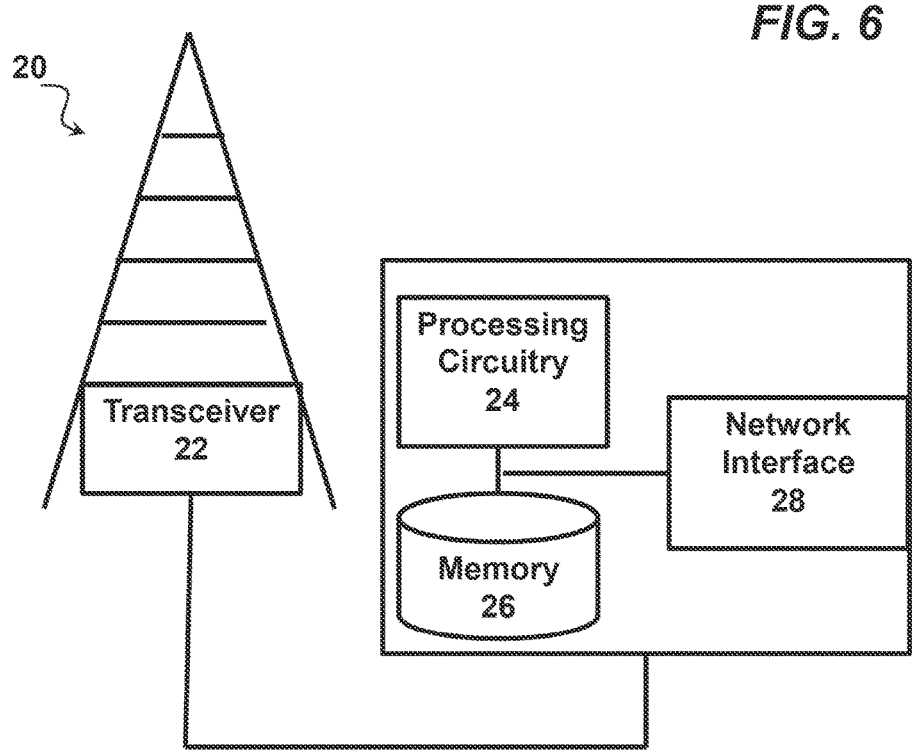
FIG. 7 is a block diagram of an example network node for use in a radio communications network, in accordance with certain embodiments.

FIG. 7 is a block diagram of a radio network node 20, in accordance with certain embodiments of the present disclosure. As discussed above, a radio network node is one example of a network node. Radio network node 20 may include one or more of a transceiver 22, processing circuitry 24, memory 26, and network interface 28. The transceiver 22 may comprise receiver and transmitter capabilities. In some embodiments, the transceiver 22 facilitates transmitting wireless signals to and receiving wireless signals from wireless device 10 (e.g., via an antenna), the processing circuitry 24 executes instructions to provide some or all of the functionalities described above as being provided by radio network node 20 (or, more generally, as being provided by a network), the memory 26 stores the instructions for execution by the processing circuitry 24, and the network interface 28 communicates signals to backend network components, such as a gateway, switch, router, Internet, Public Switched Telephone Network (PSTN), core network nodes 30 or radio network controllers, etc.

The processing circuitry 24 may include any suitable combination of hardware and software implemented in one or more modules to execute instructions and manipulate data to perform some or all of the described functions of radio network node 20 (or, more generally, of a network), such as those described above (including those described as being performed by a receiver or a transmitter). In some embodiments, the processing circuitry 24 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the processing circuitry may comprise one or more of the modules discussed below with respect to FIG. 8.

The memory 26 is generally operable to store instructions, such as a computer program, software, an application including one or more of logic, rules, algorithms, code, tables, etc. and/or other instructions capable of being executed by a processing circuitry 24. Examples of memory 26 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 28 is communicatively coupled to the processing circuitry 24 and may refer to any suitable device operable to receive input for radio network node 20, send output from radio network node 20, perform suitable processing of the input or output or both, communicate to other devices, or any combination of the preceding. The network interface 28 may include appropriate hardware (e.g., port, modem, network interface card, etc.) and software, including protocol conversion and data processing capabilities, to communicate through a network.

Other embodiments of radio network node 20 may include additional components beyond those shown in FIG. 7 that may be responsible for providing certain aspects of the access node's functionality, including any of the functionality described above and/or any additional functionality (including any functionality necessary to support the solutions described above). The various different types of access nodes may include components having the same physical hardware but configured (e.g., via programming) to support different radio access technologies, or may represent partly or entirely different physical components.

Processing circuitry 24, interfaces 22 and/or 28, and memory 26 similar to those described with respect to FIG. 7 may be included in other network nodes (such as core network node 30). Other network nodes may optionally include or not include a wireless interface (such as the transceiver 22 described in FIG. 7).

Figure 8:
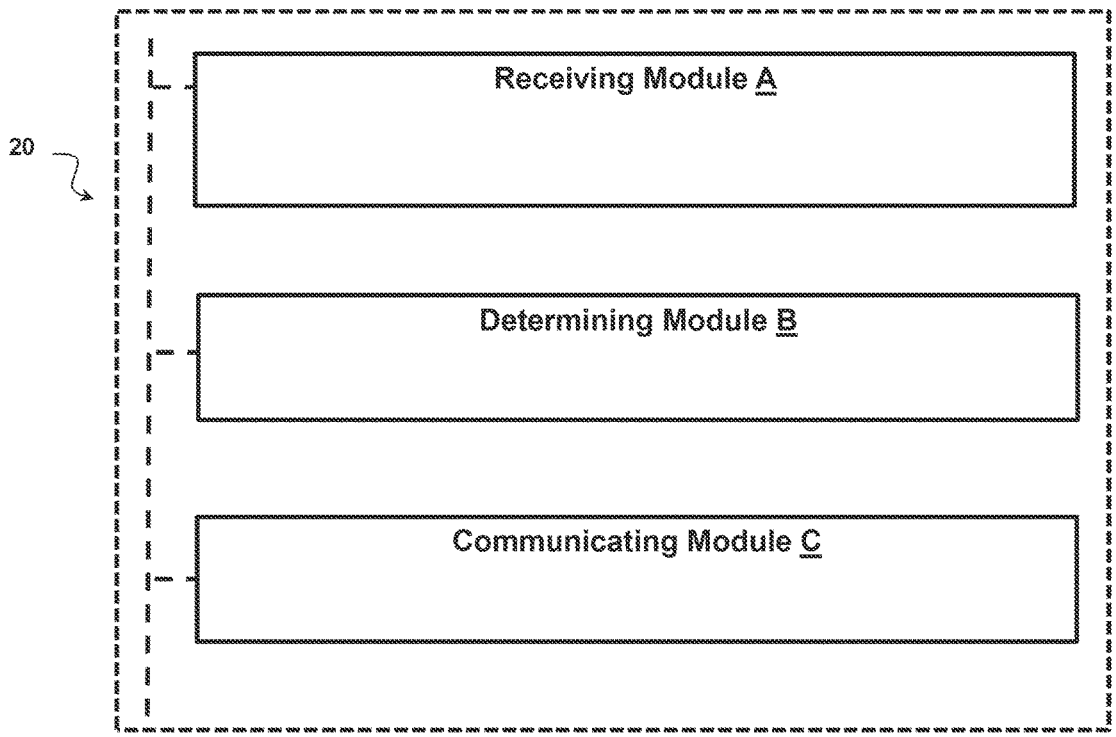
FIG. 8 is a block diagram illustrating examples of modules that may be included in the example network node, in accordance with certain embodiments.

FIG. 8 is a block diagram illustrating examples of modules that may be included in a network node, such as radio network node 20 or core network node 30, in accordance with certain embodiments of the present disclosure. In certain embodiments, radio network node 20 may include any one or more of: receiving module A, determining module B, communicating module C, and/or other suitable modules. The functionality of the modules may be integrated in a single component or separated among several components in any suitable manner. In certain embodiments, one or more of the modules may be implemented using processing circuitry 24 described with respect to FIG. 7. In general, in certain embodiments, receiving module A may include any suitable interface and/or other circuitry to receive signaling from wireless devices 10. For example, in certain embodiments, receiving module may receive HARQ ACK/NACK feedback.

Receiving module A may provide the received information to determining module B, and determining module B may use the information when making determinations. In certain embodiments, the determining module may determine to adjust a retransmission based on at least the receiver decoding time of combined soft information from multiple transmissions. The determining module may instruct communicating module C to communicate the retransmission accordingly. The modules may be configured to receive (module A), determine (module B), and communicate (module C) additional or different information in order to support the various embodiments described herein.

The following are examples of methods that may be used in a receiver (such as a receiver of wireless device 10 or radio network node 20), methods that may be used in a transmitter (such as a transmitter of wireless device 10 or radio network node 20), and methods that may be used in a network (such as methods that may be performed by radio network node 20), according to certain embodiments.

Figure 9:
FIG. 9 is a flow diagram of a first method in a receiver, in accordance with certain embodiments.

1. A method for use in a receiver, the method comprising:
    configuring the receiver to use multi-bit hybrid automatic repeat request (HARQ) feedback per transport block; and
    adjusting the number of code block groups to send negative acknowledgement (NACK) feedbacks based on at least the decoding time of combined soft information from multiple transmissions.
    (See e.g., FIG. 9).

Figure 10:
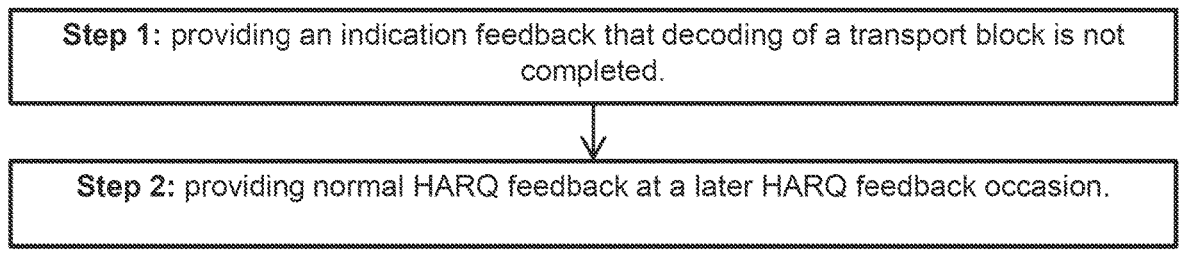
FIG. 10 is a flow diagram of a second method in a receiver, in accordance with certain embodiments.

2. A method for use in a receiver, the method comprising:
    providing an indication feedback that decoding of a transport block is not completed; and
    providing normal HARQ feedback at a later HARQ feedback occasion.
    (See e.g., FIG. 10).

Figure 11:
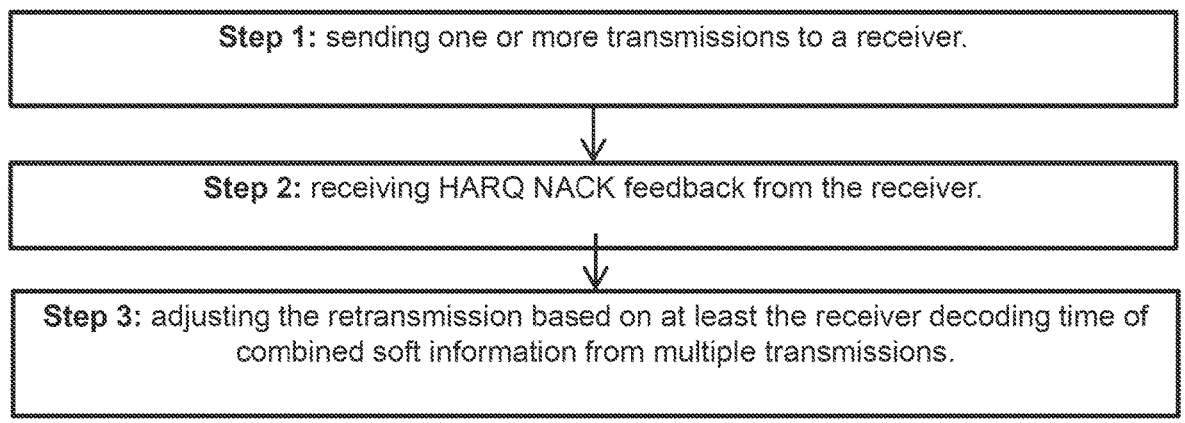
FIG. 11 is a flow diagram of a first method in a transmitter, in accordance with certain embodiments.

3. A method for use in a transmitter, the method comprising:
    sending one or more transmissions to a receiver;
    receiving HARQ NACK feedback from the receiver; and
    adjusting the amount of coded bits to send to the receiver in a retransmission based on at least the receiver decoding time of combined soft information from multiple transmissions.
    (See e.g., FIG. 11).

4. A method for use in a transmitter, the method comprising:
    sending one or more transmissions to a receiver;
    receiving HARQ NACK feedback from the receiver; and
    adjusting the number of code block groups to send coded bits for retransmission based on at least the receiver decoding time of combined soft information from multiple transmissions.
    (See e.g., FIG. 11).

Figure 12:
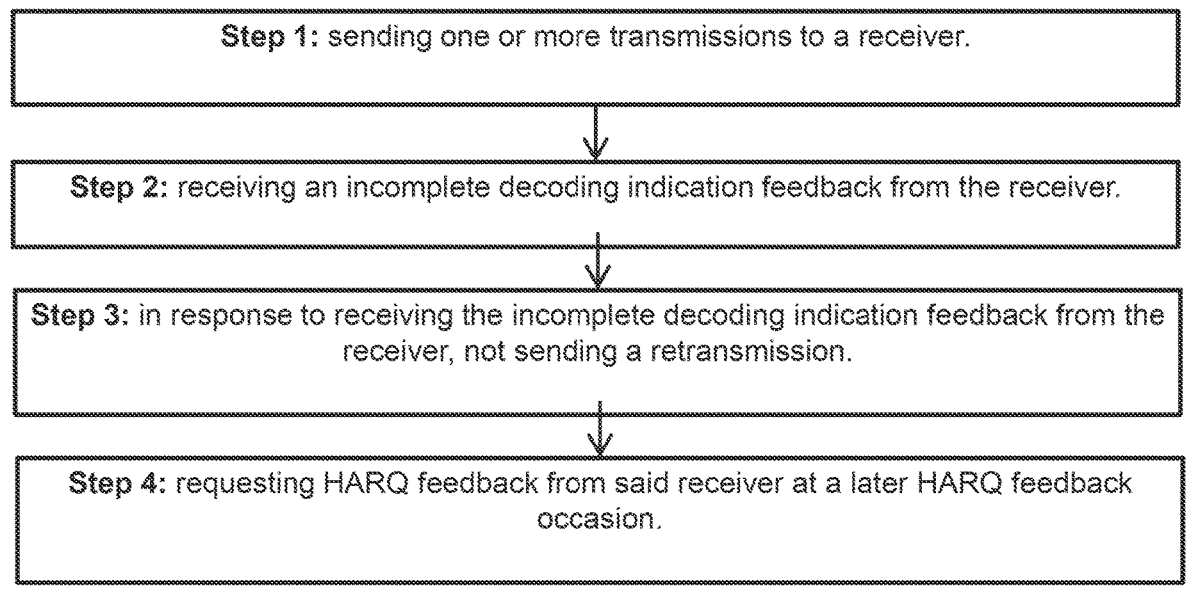
FIG. 12 is a flow diagram of a second method in a transmitter, in accordance with certain embodiments.

5. A method for use in a transmitter, the method comprising:
    sending one or more transmissions to a receiver;
    receiving an incomplete decoding indication feedback from the receiver;
    in response to receiving the incomplete decoding indication feedback from the receiver, not sending a retransmission; and requesting HARQ feedback from said receiver at a later HARQ feedback occasion.
    (See e.g., FIG. 12).

6. A method in a network, the method comprising:
    adjusting the amount of data the UE shall transmit to the network in the time slot after a time slot in which the network requests the UE to send UL retransmission based on at least the network decoding time of combined soft information from multiple transmissions.

7. A method in a network, the method comprising:
    adjusting the number of code block groups for which the network requests the UE to retransmit to the network based on at least the receiver decoding time of combined soft information from multiple transmissions.

8. A method, comprising:
    using different HARQ feedback timings based on at least receiver decoding times.

9. A computer program product comprising a non-transitory computer readable medium storing computer readable program code, the computer readable program code comprises: program code for performing any of methods 1-8.

The following are examples of nodes (e.g., wireless device 10 or radio network node 20) and network nodes (e.g., radio network node 20), according to certain embodiments.

10. A node, comprising:
    processing circuitry operable to:
        configure the receiver to use multi-bit hybrid automatic repeat request (HARQ) feedback per transport block; and
        determine an adjustment for negative acknowledgement (NACK) feedback based on at least the decoding time of combined soft information from multiple transmissions; and
    an interface operable to:
        send the NACK feedback to a transmitter according to the determined adjustment.

11. A node comprising:
    processing circuitry operable to determine that decoding of a transport block is not completed; and
    an interface operable to communicate an indicator to a transmitter, the indicator indicating that the decoding of the transport block is not completed.

12. A node comprising:
    one or more interfaces operable to:
    send one or more transmissions to a receiver; and
    receive HARQ NACK feedback from the receiver; and
    processing circuitry operable to adjust a retransmission based on at least the receiver decoding time of combined soft information from multiple transmissions.

13. A node comprising:
    one or more interfaces operable to:
    send one or more transmissions to a receiver; and
    receive an incomplete decoding indication feedback from the receiver; and processing circuitry operable to:
    in response to receiving the incomplete decoding indication feedback from the receiver, not sending a retransmission; and
    determine to request HARQ feedback from said receiver at a later HARQ feedback occasion;
    the one or more interfaces further operable to request the HARQ feedback at the later HARQ feedback occasion.

14. A network node comprising processing circuitry operable to adjust the amount of data the UE shall transmit to the network in the time slot after a time slot in which the network requests the UE to send UL retransmission based on at least the network decoding time of combined soft information from multiple transmissions.

15. A network node comprising processing circuitry operable to adjust the number of code block groups for which the network requests the UE to retransmit to the network based on at least the receiver decoding time of combined soft information from multiple transmissions.

16. A node operable to use different HARQ feedback timings based on at least receiver decoding times.

Figure 13:
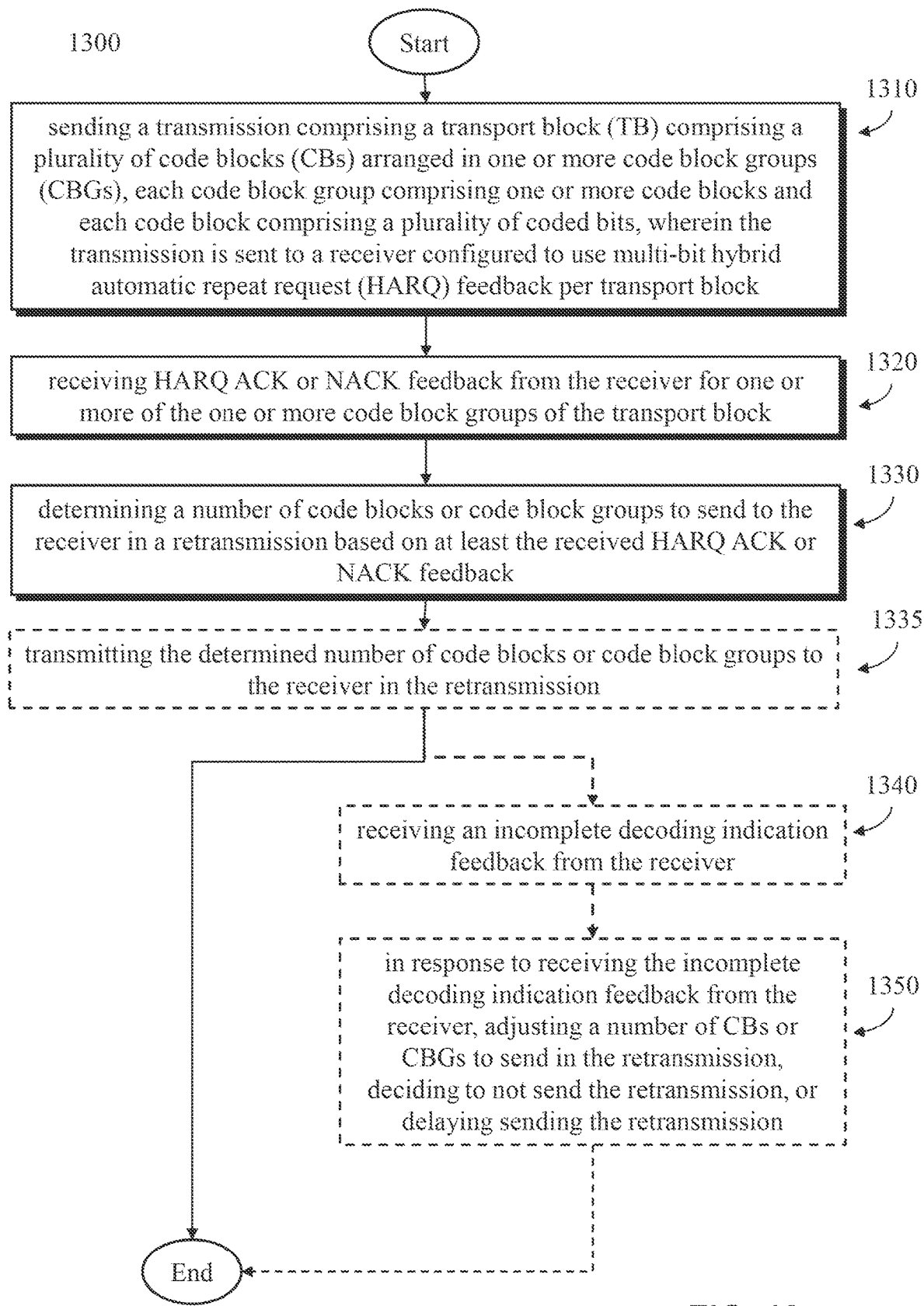
FIG. 13 is a flow diagram of a third method for use in a transmitter, in accordance with certain embodiments.

FIG. 13 is a flowchart diagram of an example method 1300 for use in a transmitter, such as wireless device 10 or network node 20. Method 1300 may begin at step 1310. At step 1310, the transmitter may send a transmission comprising a transport block (TB) comprising a plurality of code blocks (CBs) arranged in one or more code block groups (CBGs). Each code block group may comprise one or more code blocks and each code block comprises a plurality of coded bits. The transmission may be sent to a receiver configured to use multi-bit hybrid automatic repeat request (HARQ) feedback per transport block.

At step 1320, the transmitter may receive HARQ ACK or NACK feedback from the receiver for one or more of the code block groups of the transport block. At step 1330, the transmitter may determine a number of code blocks or code block groups to send to the receiver in a retransmission based on at least the received HARQ ACK or NACK feedback. In certain embodiments, the determination in step 1330 allows for adjusting the code blocks or code block groups to be sent in the retransmission based on the receiver decoding status or decoding capability. For example, in certain embodiments, the number of code blocks or code block groups may be determined differently for each HARQ feedback receipt occasion. In some cases, the transmitter may determine to retransmit all code blocks or code block groups for which NACK feedback was received because, based on the feedback, the transmitter can determine that the receiver may handle the additional decoding load of the retransmitted coded blocks or code block groups or that the receiver has successfully or unsuccessfully decoded each of the transmitted code block groups previously sent. As an example, the transmitter may compare the received feedback with corresponding transmission to determine whether feedback for every code block or code block group has been provided at this feedback occasion. If not, then the transmitter may determine that less than all of the code blocks or code block groups for which NACK feedback was received should be sent in the retransmission or delay the retransmission. As another example, the transmitter may obtain information from the feedback that indicates the decoding status at the receiver. If a large proportion of the feedback is NACK despite otherwise good transmission conditions, the transmitter may determine that the receiver has a decoding backlog and may limit the retransmission to only a subset of the code blocks or code block groups for which NACK feedback was received.

The transmitter may determine the number of code blocks and code block groups for every feedback occasion or, in some embodiments, only determine after a certain number of feedback occasions. For example, if the transmitter obtains information about the decoding status of the receiver, it may use that decoding status of the receiver in determining the number of code blocks or code block groups in more than one feedback occasion. This may allow the transmitter to avoid updating the decoding status after every feedback occasion. In some embodiments, the transmitter may update the decoding status of the receiver after every receipt of HARQ feedback. Thus, the transmitter may control the retransmission on a code block or code block group basis based on the HARQ feedback received for a transmitted transport block.

In certain embodiments, after the number of code blocks or code block groups are determined in step 1330, the transmitter may transmit the determined number of code blocks or code block groups to the receiver in the retransmission, as shown in optional step 1335. For example, the transmitter may determine a number that is less than the number of code blocks or code block groups for which it has received a NACK feedback. The transmitter may then send only that number of code blocks or code block groups in the retransmission. In this manner, the transmitter may allow the receiver more time to decode the amount of code blocks and/or code blocks transmitted in the retransmission based on the received feedback.

In certain embodiments, method 1300 may include one or more additional steps. For example, in certain embodiments, method 1300 comprises optional steps 1340 and 1350. At step 1340, the transmitter may receive an incomplete decoding indication feedback from the receiver. For example, the receiver may transmit an indication that it has not completed decoding (or its attempt to decode) the previously transmitted transport block or all code block groups within it. At step 1350, in response to receiving the incomplete indication feedback from the receiver, the transmitter may adjust a number of code blocks or code block groups to send in retransmission, decide not to send the retransmission, or delay sending the retransmission. For example, if indicated that the receiver has not had enough time to decode the previous transmission, the transmitter may reduce the number of code blocks or code block groups to send in retransmission so as not to overwhelm the receiver with excessive decoding load. In another example, the transmitter may decide not to send a retransmission. As yet another example, the transmitter may delay sending the retransmission. In some cases, the transmitter may wait until further feedback (e.g., that the receiver has completed the decoding of the previous transport block) before sending the retransmission. In some cases, the transmitter may wait a predetermined amount of time or a predetermined number of feedback occasions to send the retransmission.

In certain embodiments, HARQ NACK feedback is received for each of the one or more CBGs when the TB fails a TB cyclic redundancy check in the receiver. In some embodiments, determining the number of code blocks or code block groups comprises determining to send all CBGs of the TB to the receiver in the retransmission. In some embodiments, determining the number of code blocks or code block groups comprises sending only a subset (fewer than all) of the CBGs of the TB to the receiver in the retransmission. For example, the receiver may indicate to the transmitter to only retransmit a subset of the CBGs In certain embodiments, determining the number of code blocks or code block groups in the retransmission is further based on a decoding time of the receiver to decode the received code blocks of the transport block. For example, the transmitter may obtain information regarding the decoding load and/or decoding capabilities at the receiver. Based on this information, the transmitter may determine the number of code blocks or code block groups to send in retransmission. For example, if the decoding load is high at the receiver, the transmitter may determine a lower number of code blocks or code block groups to send in retransmission. Alternatively, if the decoding load is low at the receiver, the transmitter may determine a higher number of code blocks or code block groups to send in retransmission.

In certain embodiments, determining the number of CBs or CBGs comprises reducing the number of CBs in the retransmission such that only a subset of CBs or only a subset of CBGs in the TB for which HARQ NACK feedback has been received are retransmitted. For example, the transmitter may refrain from sending all NACK feedback CBs or CBGs if the receiver will not be able to handle the additional decoding load.

In certain embodiments, method 1300 may further comprise the step of reducing a number of CBs or CBGs to send to the receiver in one or more timeslots after the retransmission. For example, after retransmission, the transmitter may obtain information regarding the decoding load at the receiver. This information may be based on previous transmission transmitted by the transmitter, including the transmitter's retransmissions. In some embodiments, the transmitter may delay further transmissions of a further transport block until the receiver has had additional time to decode the previous transport block and/or retransmitted code blocks and/or code block groups.

In certain embodiments, method 1300 further comprises the step of the transmitter signaling one or more indications to the receiver. The one or more indications may provide information from which the receiver can determine a first number of CBGs of the TB to respond to with acknowledgement (ACK) or negative acknowledgement (NACK) feedback based on feedback of unsuccessfully decoded CBs or CBGs in a previous transmission. For example, the transmitter may coordinate with the receiver to determine a subset of CBGs to respond to with HARQ feedback. In this manner, the receiver may not attempt to decode all CBGs of the transport block, which may reduce the redundancy of retransmissions of CBGs by the transmitter. In some embodiments, the one or more indications are configured to cause the receiver to perform any of the methods for use in a receiver as describe below, e.g., in reference to FIG. 14.

In certain embodiments, method 1300 further comprises the step of indicating to the receiver which code block groups of the one or more CBGs are in the retransmission. In this manner, the receiver may determine what CGBs are retransmitted in order to coordinate the decoding of those CBGs.

In certain embodiments, method 1300 further comprises the step of sending the receiver one or more settings for HARQ feedback timing. For example, the transmitter may control the HARQ feedback timing at the receiver based on the decoding time at the receiver. In this manner, the HARQ feedback timing may be set optimally to allow the receiver to provide feedback for most, if not all, of the transport block. In some embodiments, the one or more settings are sent dynamically via a downlink control channel. In some embodiments, the one or more settings configure HARQ feedback timing for the retransmission to be longer than HARQ feedback timing for the transmission. For example, the retransmission may be sent with a lower code rate, which may require a longer decoding time at the receiver. The longer HARQ feedback timing may allow the receiver to decode the retransmission at the lower code rate before having to provide feedback.

Certain embodiments of method 1300 have been described as including features discussed in earlier sections of the present disclosure, such as certain features discussed in sections 1.1, 1.2, 3.1, 3.2, 4.1, 4.2, and 4.3 and the sections discussing decoding time determination. Certain embodiments of method 1300 can be modified to include any of the other features described in the earlier sections as being performed by a transmitter (e.g., including features described in the earlier sections as being performed by a network node, such as an eNB or gNB, that transmits to a wireless device or UE).

Figure 14:
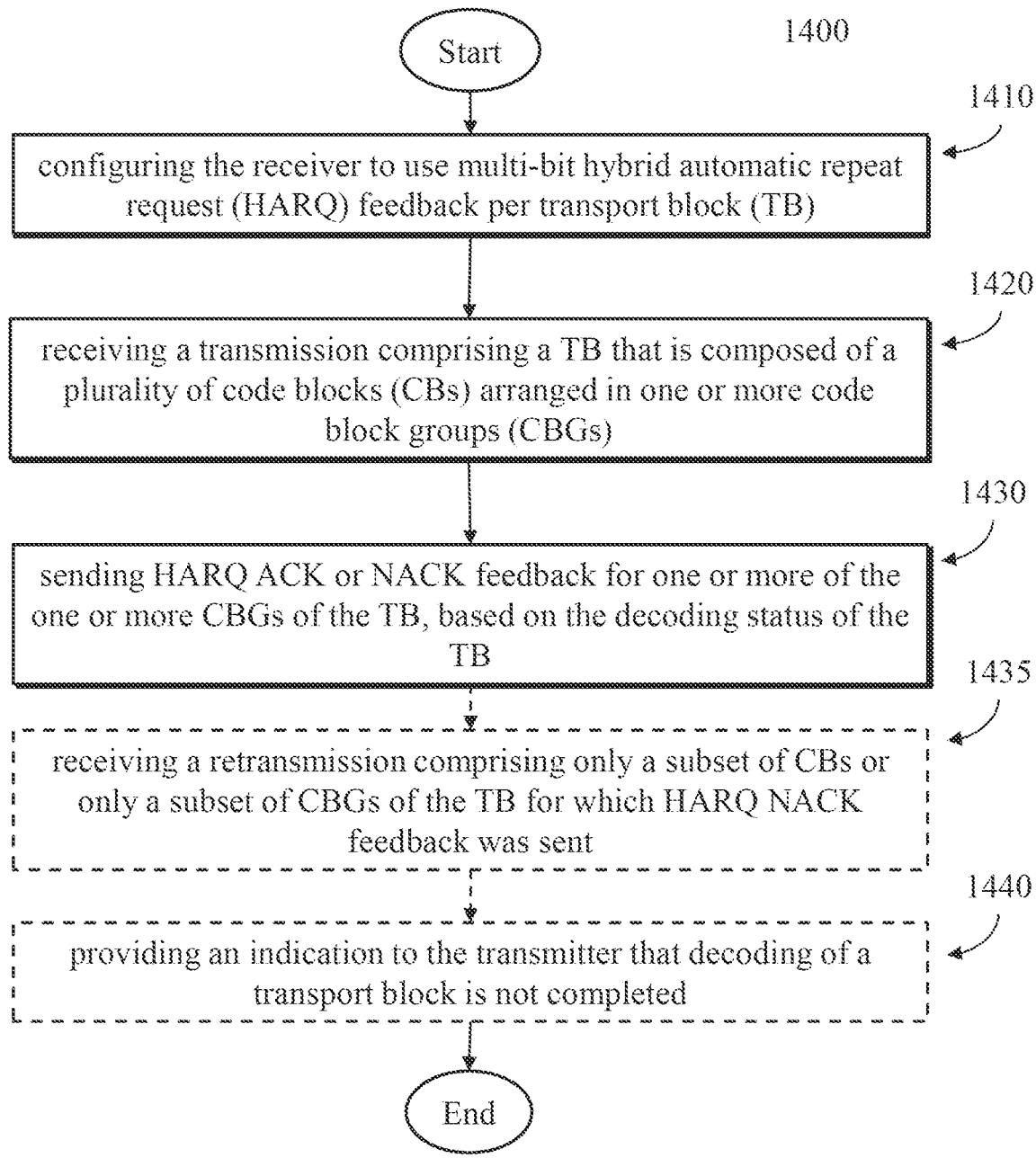
FIG. 14 is a flow diagram of a third method for use in receiver, in accordance with certain embodiments.

FIG. 14 is a flowchart diagram of an example method 1400 for use in a receiver, such as wireless device 10 and/or network node 20. Method 1400 may begin at step 1410, wherein the receiver is configured to use multi-bit hybrid automatic repeat request (HARQ) feedback per transport block (TB). For example, the receiver may determine to provide multi-bit HARQ feedback itself or the receiver may receive instructions to provide this functionality. By configuring the receiver to use multi-bit HARQ feedback, the receiver may be configured to provide multiple ACK/NACK feedback bits for each TB, e.g., a bit for each code block group.

At step 1420, the receiver may receive a transmission comprising a TB composed of a plurality of code blocks (CBs) arranged in one or more code block groups (CBGs). At step 1430, the receiver may send HARQ ACK or NACK feedback for each CBG of the TB. The receiver may send the ACK/NACK feedback based on the decoding status of the TB. For example, the receiver may determine the ACK/NACK feedback based on whether the receiver may decode each CBG of the TB before reporting ACK/NACK feedback. In some embodiments, the receiver may provide feedback for every code block group. For example, the receiver may provide NACK feedback for code block groups that are undecoded, in addition to the code block groups that were unsuccessfully decoded. As another example, the receiver may provide ACK feedback for undecoded or some subset thereof. The transmitter may use the sent feedback to schedule the next transmission or retransmission. In this manner, the receiver may control the multi-bit HARQ feedback based on the decoding status at the receiver.

In certain embodiments, a retransmission may be received based on the sent HARQ ACK or NACK feedback. At optional step 1435 the receiver may receive a retransmission of the code blocks or code block groups for which the receiver has provided feedback. For example, the transmitter may retransmit one or more code blocks or code block groups for which the receiver has provided NACK feedback. In some embodiments, the receiver may receive a transmission comprising only a subset of the code blocks or only a subset of the code block groups of the transport block for which HARQ NACK feedback was sent. For example, the receiver may receive a transmission that comprises only a subset of the code blocks or code block groups for which the receiver has provided feedback. In this manner, the receiver may have a reduced decoding load from the retransmission that may allow the receiver to decode previously undecoded coded bits or successfully or unsuccessfully decode the coded bits of the retransmission before providing HARQ feedback.

In certain embodiments, method 1400 may comprise one or more additional and/or optional steps. For example, in certain embodiments, method 1400 may further comprise step 1440. At step 1440, the receiver may provide an indication to the transmitter that decoding of the transport block is not complete. For example, the receiver may determine that the current TB will not be decoded before it reports HARQ feedback. The receiver may provide the indication to the transmitter for a number of reasons. For example, the transmitter may use the indication to adjust the number of CBGs and/or CBs to send in a retransmission or further transmissions to the receiver. As another example, the indication may indicate to the transmitter that the receiver is not going to provide HARQ feedback at this feedback occasion, but will provide HARQ feedback at the next occasion or at some later occasion. In this manner, the HARQ feedback is better coordinated between the receiver and the transmitter.

In certain embodiments, in addition to providing the indication to the transmitter that decoding of a transport block is not completed, as in step 1440, the receiver may also send NACK feedback for code block groups of the transport block for which decoding is not finished. In this manner, the receiver may still provide feedback even if it indicates that decoding is still ongoing.

In certain embodiments, method 1400 further comprises the step of provide HARQ NACK feedback for each of the CBGs when the TB fails a TB cyclic redundancy check in the receiver. In some embodiments, method 1400 further comprises the step of receiving a re-transmission of all CBs or CBGs of the TB. For example, if the TB fails a TB CRC check, the receiver may not know which CBGs were erroneous. The receiver may then provide NACK feedback for all CBs and CBGs. In response, the transmitter may retransmit all CBs and CBGs. In some embodiments, method 1400 further comprises receiving a re-transmission of a subset of the CBs or CBGs of the TB. For example, the receiver may provide ACK feedback for a subset of the CBGs and NACK feedback for another subset of CBGs. In this manner, the full TB may not be retransmitted.

In certain embodiments, determining the HARQ ACK or NACK feedback comprises the substep of sending NACK feedback for a first subset of CBGs of the one or more CBGs of the TB. The first subset comprises CBGs that include one or more unsuccessfully decoded CBs as determined at a first HARQ feedback occasion. For example, the receiver may provide NACK feedback for only the subset of CBGs that were unsuccessfully decoded. In some embodiments, the first subset of code block groups does not include CBGs for which decoding has not been completed by the first HARQ feedback occasion. In this manner, the receiver may refrain from providing NACK feedback for undecoded CBGs to prevent unnecessary retransmission and use of radio resources.

In certain embodiments, method 1400 further comprises the step of determining a set of CBGs of the TB for which to send negative acknowledgement (NACK) feedback at a different HARQ feedback occasion based on at least a decoding time for unsuccessfully decoded information received from previous transmissions and retransmissions. For example, the receiver may determine a subset of CBGs for which decoding is unsuccessful, but then delay the transmission of NACK feedback until another feedback occasion, at which the receiver may have been able to complete the decoding of the transport block or some significant portion thereof.

In certain embodiments, determining the HARQ ACK or NACK feedback for each CBG of the TB is further based on an overall decoding load at the receiver. In some embodiments, the receiver receives data from more than one serving cell or bandwidth slice. Accordingly, the overall decoding load may be based on decoding loads from received data from each serving cell or bandwidth slice. In some embodiments, the receiver is receiving data from more than one connected wireless node. Accordingly, the overall decoding load may be based on decoding loads from received data from each wireless node.

In certain embodiments, method 1400 further comprises the step of sending ACK feedback for one or more undecoded or unsuccessfully decoded code block groups. In some embodiments, the number of undecoded or unsuccessfully decoded code block groups for which ACK feedback is sent is based on one or more of a receiver capability, a decoder latency of the receiver, a code rate of a transmission, and a number of code blocks in a code block group.

In certain embodiments, method 1400 further comprises the step of receiving a retransmission comprising a TB that includes a plurality of CBs arranged in one or more CBGs. Method 1400 may further comprise the step of sending ACK or NACK feedback for the retransmission according to a HARQ feedback timing. The HARQ feedback timing may be based on a number of CBs or a number of CBGs that were received in the retransmission. For example, the receiver may adjust its feedback timing to accommodate the received CBs and/or CBGs. In some cases, the receiver may coordinate with the transmitter expecting feedback to ensure that unnecessary retransmissions are avoided.

Certain embodiments of method 1400 have been described as including features discussed in earlier sections of the present disclosure, such as certain features discussed in sections 2.1, 2.2, 3.1, 3.2, 4.1, 4.2, and 4.3 and the sections describing decoding time determination. Certain embodiments of method 1400 can be modified to include any of the other features described in the earlier sections as being performed by a receiver (e.g., including features described in the earlier sections as being performed by a wireless device, such as a UE that receives transmissions from a network node, such as an eNB or gNB).

In certain embodiments, one or more steps of the methods described above may be carried out using one or more components of wireless device 10 or network node 20. For example, one or more receiving, sending, transmitting, or indicating steps may be carried out using transceiver 12 of wireless device 10 and/or transceiver 22 of network node 20. As another example, one or more determining or adjusting steps may be carried out using processing circuitry 14 of wireless device 10 and/or processing circuitry 24 of network node 20. In this manner, one or more of the methods described above may be carried out by wireless device 10 or network node 20, each of which may be used as a transmitter and/or a receiver.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, memory 16 of wireless device 10 or memory 26 of network node 20 may comprise computer readable means, on which a computer program can be stored, such as storage for non-transitory computer readable media. The computer program may include instructions which cause processing circuitry 14 or 24 (and any operatively coupled entities and devices, such as transceiver 12/22 and memory 16/26) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processing circuitry 14 and/or 24, possibly in cooperation with memory 16 and/or 26. Processing circuitry 14 and/or 24 and memory 16 and/or 26 may thus be arranged to allow processing circuitry 14 and/or to fetch instructions from memory 16 and/or 26 and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method for use in a receiver, the method comprising:
configuring the receiver to use multi-bit hybrid automatic repeat request (HARQ) feedback per transport block (TB); and
receiving an earlier transmission comprising a TB that is composed of a plurality of code blocks (CBs) arranged in one or more code block groups (CBGs), where each CBG comprises one or more code blocks (CBs);
for each CBG:
    sending a HARQ ACK for the CBG when the CBG decoding status indicates correct decoding and when the decoding status of the TB indicates correct decoding; or
    sending a HARQ NACK for the CBG when the CBG decoding status indicates incorrect decoding or when the decoding status of the TB indicates incorrect decoding.

2. The method of claim 1, and further comprising:
at a later transmission, receiving a retransmission of the TB that includes a second set of one or more of the CBGs of the TB, each CBG having the same one or more CBs as in the earlier transmission, wherein the second set of CBGs is the same as, or a subset of, the first set of CBGs; and
wherein in the earlier transmission the decoding status of the TB indicates incorrect decoding, and the decoding status of at least one CBG in the second set indicates correct decoding.

3. The method of claim 1, further comprising receiving a re-transmission of a subset of the CBs or CBGs of the TB.

4. The method of claim 1, and further comprising providing an indication to the transmitter that decoding of a transport block is not completed.

5. The method of claim 1, and further comprising:
receiving a retransmission comprising a TB that includes a plurality of CBs arranged in one or more CBGs; and
sending ACK or NACK feedback for the retransmission according to a HARQ feedback timing, wherein the HARQ feedback timing is based on a number of CBs or a number of CBGs that were received in the retransmission.

6. The method of claim 1, and further comprising receiving a re-transmission of all CBs or CBGs of the TB.

7. The method of claim 1, wherein sending the HARQ ACK or NACK feedback for each CBG of the TB is further based on an overall decoding load at the receiver.

8. The method of claim 1, wherein:
the receiver receives data from more than one serving cell or bandwidth slice; and
the overall decoding load is based on decoding loads from received data from each serving cell or bandwidth slice.

9. The method of claim 1, wherein:
the receiver is receiving data from more than one connected wireless node; and
the overall decoding load is based on decoding loads from received data from each wireless node.

10. The method of claim 1, further comprising sending ACK feedback for one or more undecoded or unsuccessfully decoded code block groups.

11. The method of claim 1, wherein a number of undecoded or unsuccessfully decoded code block groups for which ACK feedback is sent is based on one or more of a receiver capability, a decoder latency of the receiver, a code rate of a transmission, and a number of code blocks in a code block group.

12. The method of claim 1, further comprising:
receiving a retransmission comprising a TB that includes a plurality of CBs arranged in one or more CBGs; and
sending ACK or NACK feedback for the retransmission according to a HARQ feedback timing, wherein the HARQ feedback timing is based on a number of CBs or a number of CBGs that were received in the retransmission.

13. A receiver comprising:
one or more interfaces;
memory; and
processing circuitry configured to execute instructions stored in the memory, whereby the receiver is configured to:
    configure the receiver to use multi-bit hybrid automatic repeat request (HARQ) feedback per transport block (TB); and
    receive an earlier transmission comprising a TB that is composed of a plurality of code blocks (CBs) arranged in one or more code block groups (CBGs), where each CBG comprises one or more code blocks (CBs);
    for each CBG:
        send a HARQ ACK for the CBG when the CBG decoding status indicates correct decoding and when the decoding status of the TB indicates correct decoding; or
        send a HARQ NACK for the CBG when the CBG decoding status indicates incorrect decoding or when the decoding status of the TB indicates incorrect decoding.

14. The receiver of claim 13, wherein the receiver is further configured to receive a re-transmission of all CBs or CBGs of the TB.

15. The receiver of claim 13, wherein the receiver is further configured to receive a re-transmission of a subset of the CBs or CBGs of the TB.

16. The receiver of claim 13, wherein the receiver is further configured to provide an indication to a transmitter that decoding of a transport block is not completed.

17. The receiver of claim 13, wherein the receiver is further configured to:
receive a retransmission comprising a TB that includes a plurality of CBs arranged in one or more CBGs; and
send ACK or NACK feedback for the retransmission according to a HARQ feedback timing, wherein the HARQ feedback timing is based on a number of CBs or a number of CBGs that were received in the retransmission.

18. The receiver of claim 13, wherein:
the receiver receives data from more than one connected wireless node; and
the overall decoding load is based on decoding loads from received data from each wireless node.

19. A computer program product comprising a non-transitory computer readable storage medium storing computer readable program code, the computer readable program comprising:

program code for configuring the receiver to use multi-bit hybrid automatic repeat request (HARQ) feedback per transport block (TB);

program code for receiving an earlier transmission comprising a TB that is composed of a plurality of code blocks (CBs) arranged in one or more code block groups (CBGs), where each CBG comprises one or more code blocks (CBs);

wherein program code for sending HARQ ACK or NACK feedback comprises program code for sending, for each CBG:

- a HARQ ACK for the CBG when the CBG decoding status indicates correct decoding and when the decoding status of the TB indicates correct decoding; or
- a HARQ NACK for the CBG when the CBG decoding status indicates incorrect decoding or when the decoding status of the TB indicates incorrect decoding.

* * * * *